United States Patent
Lyubarsky

(10) Patent No.: US 12,153,230 B2
(45) Date of Patent: Nov. 26, 2024

(54) APPARATUS AND METHODS TO RENDER 3D DIGITAL CONTENT HAVING MULTIPLE VIEWS

(71) Applicant: Texas Instruments Incorporated, Dallas, TX (US)

(72) Inventor: Alexander Lyubarsky, Dallas, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 37 days.

(21) Appl. No.: 16/653,552

(22) Filed: Oct. 15, 2019

(65) Prior Publication Data

US 2021/0109363 A1   Apr. 15, 2021

(51) Int. Cl.
| | |
|---|---|
| *G02B 30/35* | (2020.01) |
| *G02B 3/08* | (2006.01) |
| *G02B 26/08* | (2006.01) |
| *G02B 27/01* | (2006.01) |
| *G02B 27/18* | (2006.01) |

(Continued)

(52) U.S. Cl.
CPC .............. *G02B 30/35* (2020.01); *G02B 3/08* (2013.01); *G02B 26/0833* (2013.01); *G02B 27/0172* (2013.01); *G02B 27/18* (2013.01); *G02B 30/36* (2020.01); *H04N 13/32* (2018.05); *H04N 13/324* (2018.05); *H04N 13/351* (2018.05);

(Continued)

(58) Field of Classification Search
CPC .......... G02B 30/35; G02B 30/36; G02B 3/08; G02B 26/0833; G02B 27/0172; G02B 27/18; G02B 27/0112; G02B 27/014; G02B 27/0178; G02B 2027/0112; G02B 2027/014; G02B 2027/0178; G02B 27/0075; G02B 30/24; H04N 13/32; H04N 13/324; H04N 13/351

See application file for complete search history.

(56) References Cited

U.S. PATENT DOCUMENTS 4,840,455 A * 6/1989 Kempf ................... G02B 30/26
359/471
7,330,298 B2   2/2008 Bommersbach et al.
(Continued)

OTHER PUBLICATIONS

Maimone et al., "Computational Augmented Reality Eyeglasses," Department of Computer Science University of North Carolina at Chapel Hill, https://www.cs.unc.edu/~maimone/media/glasses_ISMAR_2013.pdf, 2013, 10 pages.

*Primary Examiner* — Michael E Teitelbaum
(74) *Attorney, Agent, or Firm* — Michelle F. Murray; Frank D. Cimino

(57) ABSTRACT

An example device includes a screen, a first light source configured to emit a first light at a first angle during a first time period and a second light source configured to emit a second light at a second angle during a second time period. The second angle is different than the first angle. The second time period is different than the first time period. The device includes a spatial light modulator configured to provide a first view of digital content based on the first angle of the first light emitted during the first time period and a second view of the digital content based on the second angle of the second light emitted during the second time period and projection optics configured to project the first view and the second view for presentation via the screen.

20 Claims, 10 Drawing Sheets

(51) Int. Cl.
  *G02B 30/36* (2020.01)
  *H04N 13/32* (2018.01)
  *H04N 13/324* (2018.01)
  *H04N 13/351* (2018.01)

(52) U.S. Cl.
  CPC  *G02B 2027/0112* (2013.01); *G02B 2027/014* (2013.01); *G02B 2027/0178* (2013.01)

(56) References Cited

U.S. PATENT DOCUMENTS

| | | |
|---|---|---|
| 9,442,294 B2 | 9/2016 | Urey |
| 9,857,591 B2 | 1/2018 | Welch et al. |
| 2010/0097671 A1* | 4/2010 | Leister ............... G02B 27/0172 359/9 |
| 2011/0285968 A1* | 11/2011 | Huang ............... H04N 9/3111 353/31 |
| 2012/0320342 A1* | 12/2012 | Richards ............... G03B 21/13 353/30 |
| 2016/0347237 A1 | 12/2016 | Bhakta et al. |
| 2017/0235143 A1 | 8/2017 | Chi et al. |

* cited by examiner

US 12,153,230 B2

APPARATUS AND METHODS TO RENDER 3D DIGITAL CONTENT HAVING MULTIPLE VIEWS

TECHNICAL FIELD

This relates generally to light field displays for presenting three-dimensional (3D) digital content and, more particularly, to apparatus and methods to render 3D content having multiple views.

BACKGROUND

Three-dimensional (3D) digital content can be presented to a user via a wearable display device such as a head-mounted device, or via a surface-mounted (e.g., tabletop) display device, such as a direct view monitor or a tabletop light field display. A motion parallax effect enables the user to perceive that he or she is seeing different views of a 3D object as if the user were looking at the object, for instance, from a right side of the object or from a left side of the object.

SUMMARY

An example device includes a screen, a first light source configured to emit a first light at a first angle during a first time period and a second light source configured to emit a second light at a second angle during a second time period. The second angle is different than the first angle. The second time period is different than the first time period. The device includes a spatial light modulator configured to provide a first view of digital content based on the first angle of the first light emitted during the first time period and a second view of the digital content based on the second angle of the second light emitted during the second time period. The first light source and the second light source are electrically coupled to the spatial light modulator. The device includes projection optics configured to project the first view and the second view for presentation via the screen. The projection optics is optically coupled to the first light source, the second light source, and the spatial light modulator.

DETAILED DESCRIPTION

Figure 1:
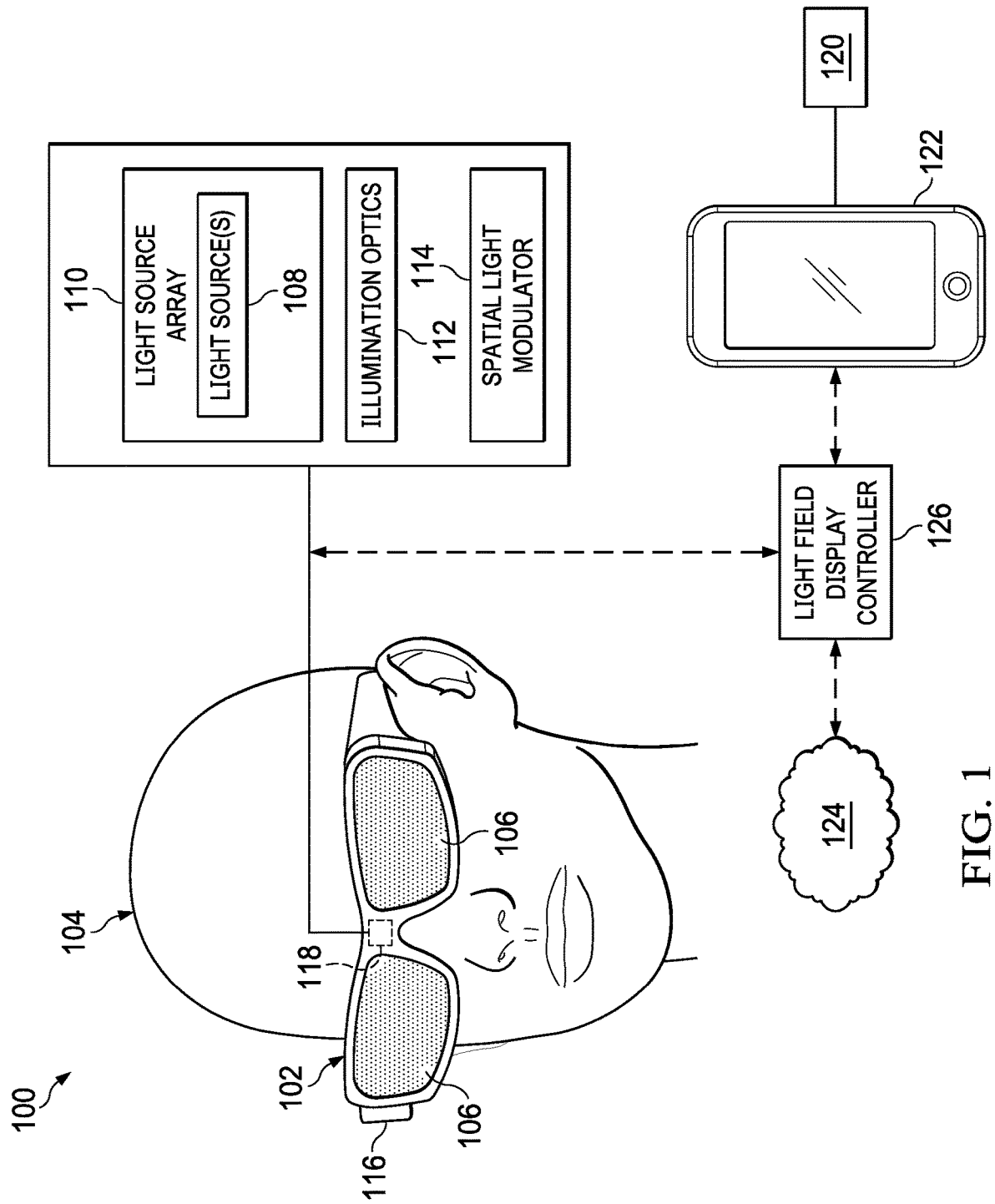
FIG. 1 illustrates an example system constructed in accordance with teachings of this disclosure and including a wearable device for presenting 3D digital content and a light field display controller for controlling presentation of the content.

The drawings are not to scale. Generally, the same reference numbers in the drawing(s) and this description refer to the same or like parts. Although the drawings show layers and regions with clean lines and boundaries, some or all of these lines and/or boundaries may be idealized. In reality, the boundaries and/or lines may be unobservable, blended and/or irregular.

Three-dimensional (3D) digital content can be presented to a user via a wearable display device such as a head-mounted display device, or via a surface-mounted (e.g., tabletop) display device, such as a direct view monitor or a tabletop light field display. When viewing 3D content representing, for instance, an object, via the display device a viewer would expect to see different features (e.g., angles) of the object depending if the viewer were looking at a left side of the object as compared to if the viewer were looking at a right side of the object. However, in some known display devices, the 3D object appears the same to the viewer despite the viewer's perceived position relative to the 3D object. Thus, the rendering of the 3D object appears unnatural, as the rendering does not enable the viewer to perceive that he or she is looking around the object (e.g., as if the viewer were manipulating the object in real life).

Even if a display device provides for a look-around or motion parallax effect in that different views of the 3D object are presented to the viewer in response to perceived changes in the viewer's position relative to the object, a tradeoff typically exists between angular resolution and spatial resolution. In at least one example, spatial resolution corresponds to the density or spacing of pixels associated with any particular view of a 3D image created by an associated light field. In at least one example, angular resolution corresponds to the number of views (e.g., stereoscopic views) created within an associated light field emanating from individual lenses in a lens array of the display device. For example, if the 3D object is a cube, the face of the cube may be presented with high spatial resolution. However, if the viewer manipulates the 3D cube to view a side of the cube, a corner where two sides of the cube join may not appear to the user as sharp due to low angular resolution.

An integral imaging based 3D display uses a lens array or lenticular array to create 3D views. To achieve high angular resolution of 3D content, a high pixel density should be used so that each view of the 3D content has sufficient spatial resolution. However, there are limits to pixel density of a display device based on, for instance, manufacturing limitations. For example, achieving higher angular resolution can include associating more pixels with each lens in the lens array of the display device. In view of pixel density limitations, achieving a higher angular resolution involves increasing the size of the individual lenses in the lens array to cover more pixels. However, such an approach can result in decreased spatial resolution of the 3D content because the pixels associated with any particular view of the 3D content are spaced farther apart due to the increased lens size. Further, increasing the number of lens used also results in decreased spatial resolution of the 3D content.

Using multiple display devices to address the pixel density limitations of the respective display devices can introduce additional challenges. For instance, in a wearable device such as a head-mounted display, adding additional displays to the wearable device to increase pixel density and achieve higher angular resolution of 3D content can be costly, add weight, and increase power consumption. Similar concerns regarding spatial resolution versus angular resolution exist with respect to surface-mounted displays, such as direct view monitors or tabletop light field displays. However, using additional surface-mounted displays also increases costs and spaced consumed. Further, introducing moving components into display devices to give the user the impression that the user is looking around a 3D object can result in manufacturing and/or operational complications.

Example wearable display devices and surface-mounted display devices described herein provide for multiple views of 3D content without sacrificing spatial resolution. In examples described herein, an array of red-green-blue (RGB) light sources is used to illuminate a spatial light modulator such as a digital micromirror device (DMD) at a different angle for each light source. The RGB light sources can include light emitting diodes (LEDs), RGB laser diodes, fiber optics, or emissive displays such as a microLED or organic light-emitting diode (OLED). In examples described herein, light emitted by each RGB light source is associated with a different view of 3D content (e.g., an object, a scene). As a result, a pupil associated with a lens system of the display device is divided by the number of RGB light sources. As each RGB light source is turned on and light emitted by each light source is focused on the spatial light modulator at a different angle, a different image on the display device is flashed via the spatial light modulator to produce a different angular view of the 3D content with the full or substantially full spatial resolution of the display device. Examples described herein provide for improved angular resolution of 3D content without sacrificing spatial resolution can occur when increasing the number of display devices and/or adding additional lens to a display device.

Some examples described herein include wearable (e.g., head-mounted) display devices in which a projection eyepiece projects the image(s) provided by the spatial light modulator for viewing by a wearer of the device at an exit pupil of the eyepiece. As the user looks through the eyepiece at location corresponding to the exit pupil, the user sees time-multiplexed views of the 3D content. In examples described herein, each light source can be time-sequentially activated with the spatial light modulator to create the different views of the 3D content via emission of light at different angles relative to the spatial light modulator.

In some examples, the multiple views are created via a surface-mounted device such as a direct view light field monitor. In such examples, an exit pupil associated with a lens system of the display devices is relayed to an eyebox or user viewing position via optics such as a Fresnel screen. In examples described herein, the eyebox includes multiple sub-pupils corresponding to the number of light sources that illuminate the spatial light modulator at different angles. Each light source is selectively activated to create different, time-multiplexed views of 3D content via the spatial light modulator. As a result, the user sees different perspective views of the 3D content within the full or substantially full spatial resolution of the surface-mounted monitor display.

FIG. 1 illustrates an example system 100 constructed in accordance with teachings of this disclosure for rendering multiple views of 3D content via a near-eye light field display device 102. As shown in FIG. 1, the example near-eye light field display device 102 includes a head-mounted device such as eyeglasses worn by a user 104 (e.g., augmented reality glasses). The near-eye light field display device 102 includes projection eyepiece optics 106 through which the user 104 views digital content (e.g., 3D content) presented via the near-eye light field display device 102. The projection eyepiece optics 106 can include one or more lens that are proximate to an eye of a user when the user wears the near-field light display device 102 and that provide means for projecting (e.g., magnifying) image(s) for viewing by the user.

The near-eye light field display device 102 of FIG. 1 includes light source(s) 108 or means for emitting light. The light source(s) 108 define a light source array 110. In the example of FIG. 1, the light source(s) 108 include RGB light source(s) that emit red light, green light, and blue light. The light source(s) 108 can include, for example, light emitting diodes (LEDs), emissive displays such as microLEDs or organic light emitting diodes (OLED), lasers, and/or fiber optics.

The near-field light display device 102 includes illumination optics 112. The illumination optics 112 include one or more lenses to direct light emitted by the light source(s) to a spatial light modulator 114 of the near-field light display device 102. The spatial light modulator 114 of FIG. 1 can include a digital micromirror device (DMD) including moveable mirrors (e.g., thousands of mirrors), where each mirror can represent a pixel. The mirrors of the DMD can be selectively controlled to direct light emitted by the light source(s) 108 toward or away from a light projection path. Thus, the spatial light modulator 114 provides means for directing light emitted by the light source(s) 108. Other types of spatial light modulators can be used with the system 100 such as a liquid crystal display (LCD) or a liquid crystal on silicon (LCOS).

The example 100 of FIG. 1 includes one or more semiconductor-based processors to control operation of the light source(s) 108 and/or the spatial light modulator 114. For example, as illustrated in FIG. 1, a processor 116 is coupled (e.g., mounted) to the near-field light display device 102. Also, the near-field light display device 102 includes a battery 118 to provide power to the processor 116 and/or other components of the near-eye light display device 102.

In other examples, the processor is separate from the near-field light display device 102. For example, a processor 120 of a user device 122 such as a smartphone or another wearable device (e.g., a smart watch) can generate instructions to control the light source(s) 108 and/or the spatial light modulator 114 of the near-eye light display device 102 via communication paths (e.g., WiFi, cellular, Bluetooth and/or other communication protocols). In other examples, one or more processor(s), server(s), and/or virtual machine(s) implemented by a cloud-based device 124 are in communication with the near-eye light display device 102 (e.g., via WiFi, cellular, Bluetooth and/or other communication protocols). In some examples, the processor 116 of the near-field light display device 102 is communicatively coupled to one or more other processors (e.g., the processor 120 of the user device 122) via one or more wired connections (e.g., a cable) or wireless connections (e.g., cellular, Wi-Fi, or Bluetooth connections).

In the example of FIG. 1, the light source(s) 108 and the spatial light modulator 114 are controlled by a light field display controller 126. The example light field display controller 126 can be implemented by software executed on the processor 116 of the near-field light display 102, the processor 120 of the wearable or non-wearable user device 122, and/or the cloud-based device 124. In some examples, one or more components of the light field display controller 126 are implemented by the on-board processor 116 of the near-eye light display 102 and one or more other components are implemented by the processor 120 of the user device 122 and/or the cloud-based device 124. The dotted lines extending from the light field display controller 126 in FIG. 1 demarcate the different locations for the light field display controller 126 (e.g., on the near-eye light display 102, in the cloud 124, and/or in a wearable or non-wearable user device 122).

In the system 100 of FIG. 1, the light field display controller 126 instructs the light sources 108 to selectively emit light based on a predefined time sequence. When a first one of the light sources 108 is activated by the light field display controller 126, the light emitted by the first light source is focused on the spatial light modulator 114 (e.g., via the illumination optics 112) at a first angle. When a second one of the light sources 108 is activated by the light field display controller 126, the light emitted by the second light source is focused on the spatial light modulator 114 at a second angle different than the first angle. The spatial light modulator 114 reflects at least some portion of the light to the projection eyepiece optics 106. The light field display controller 126 selectively instructs the spatial light modulator 114 to cause certain ones of the pixels (e.g., mirrors) to deflect light toward or away from the projection eyepiece optics 106 based on the image to be produced.

In the example of FIG. 1, the projection eyepiece optics 106 project the image(s) corresponding to the different views of the 3D content such that the user 104 views the image(s) when the user 104 places his or her eye at an exit pupil location associated with the projection eyepiece optics 106 (e.g., an area where the user's eye pupil is to be located to view the 3D content). For example, the projection eyepiece optics 106 can magnify the image(s) generated by the spatial light modulator 114 to enable the user to view the image(s) when the eye(s) of the user 104 are at the exit pupil location. As described herein, when the user looks through the exit pupil, the user will see different views of, for instance, a 3D object, as if the user were looking at the object from different sides or looking around the object based on the motion parallax effect.

In some examples, the near-field light display device 102 includes a waveguide to relay the exit pupil to the user's eye. For instance, a waveguide may be used when the projection eyepiece optics 106 are disposed proximate to the user's temple rather than directly projecting into the user's eye.

Figure 2:
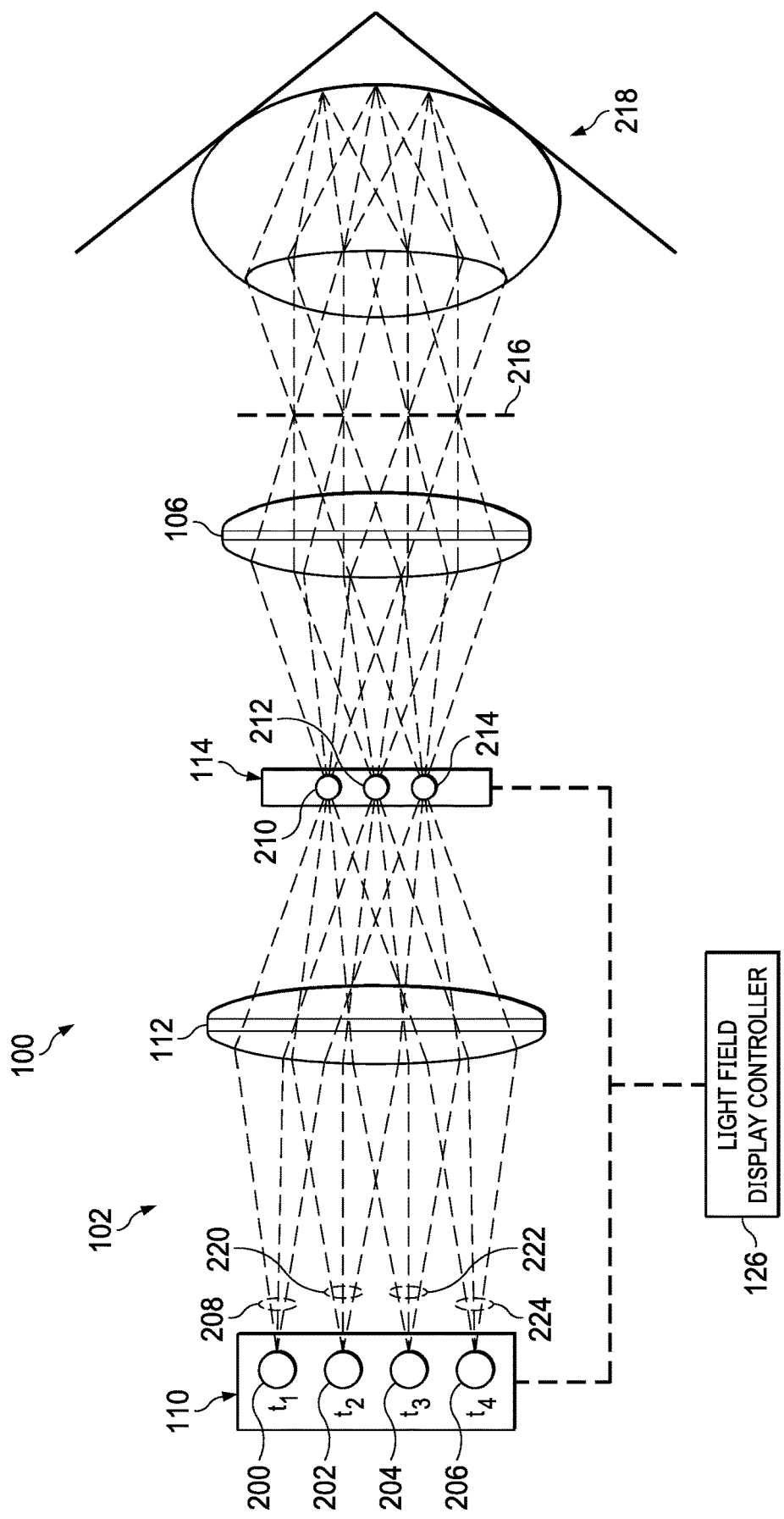
FIG. 2 is diagram illustrating the system of FIG. 1.

FIG. 2 is a diagram illustrating the system 100 of FIG. 1 and showing light emitted by the respective light sources of the light source array 110 (e.g., the light sources 108 of FIG. 1) to produce different views of 3D content. As shown in FIG. 2, the light source array 110 includes a first RGB light source 200, a second RGB light source 202, a third RGB light source 204, and a fourth RGB light source 206. The light source array 110 can include additional light sources than shown in FIG. 2. In examples disclosed herein, each of the light source 202, 202, 204, 206 can be sequenced to generate a white light for a particular 2D image based on the red, green, and blue wavelengths. Also, in examples disclosed herein, each of the light sources 200, 202, 204, 206 is sequenced with the spatial light modulator 114 to generate a different perspective image of corresponding 3D content.

As illustrated in FIG. 2, the first light source 200 emits a first light 208 during a first time period $t_1$ based on instructions received from the light field display controller 126. For instance, the first light 208 can be a blue light. In other examples, the first light 208 is a red light, a green light, or another color light based on a combination red, green, and/or blue lights. The first light 208 emitted by the first light source 200 passes through the illumination optics 112 (e.g., one or more lenses).

As shown in FIG. 2, the illumination optics 112 directs or focuses the first light 208 on the spatial light modulator 114 at a first angle. In particular, the illumination optics 112 focuses the first light 208 onto respective mirrors of the spatial light modulator 114, where the mirrors correspond to pixels of the spatial light modulator 114. For instance, the spatial light modulator 114 of FIG. 1 includes a first pixel 210, a second pixel 212, and a third pixel 214. The spatial light modulator 114 can include additional pixels than shown in FIG. 2.

In the example of FIG. 2, certain ones of the pixels 210, 212, 214 of the spatial light modulator 114 are turned on such that light is reflected by the activated pixel(s) and directed to the projection eyepiece optics 106. In examples in which the spatial light modulator 114 is a digital micromirror device, the mirror(s) of the device (e.g., the pixel(s) 210, 212, 214) are selectively tilted to either deflect light toward the projection eyepiece optics 106 (e.g., such that the pixel(s) are "on") or away from the projection eyepiece optics 106 (such that the pixel(s) are "off"). For example, the mirrors of the spatial light modulator 114 can have a tilt angle of +/−12°. In examples in which the spatial light modulator 114 includes an LCOS or LED, the pixels are turned on and off via polarization.

In the example of FIG. 2, the light field display controller 126 selectively instructs certain ones of the pixels 210, 212, 214 to turn on based on the image to be projected by the spatial light modulator 114. In FIG. 2, the light field display controller 126 selectively activates the first, second, and/or third pixels 210, 212, 214 of the spatial light modulator 114 to create image(s) corresponding to different views of the 3D content. The first light 208 (e.g., blue light) emitted by the first light source 200 is deflected by the respective pixel(s) 210, 212, 214 and directed to the projection eyepiece optics 106. As a result of the emission of the light 208 by the first light source 200 at the first angle, the projection eyepiece optics 106 magnifies a first view (e.g., a first angular view) of a 3D image of the spatial light modulator. In the example of FIG. 2, a user of the near-field light display 102 sees the magnified first view of the 3D content when the user's eye 218 is placed at the exit pupil 216.

In examples in which the system 100 of FIGS. 1 and 2 provides for augmented reality displays of 3D content, a beamsplitter or waveguide can be disposed between the projection eyepiece optics 106 and the exit pupil 216. As a result, the projected 3D content is overlaid onto the real world environment in which the user is located and that can be seen through the beamspiltter or waveguide.

As mentioned above, the first light source 200 is an RGB light source. When the first light source 200 is activated by the light field display controller 126 at the first time period $t_1$, the first light source 200 emits blue light for a first duration of the first time period $t_1$, red light for a second duration of the first time period $t_1$, and green light for a third duration of the first time period $t_1$. Thus, when the first RGB light source 200 emits blue light (e.g., the first light 208) for the first duration of the first time period $t_1$, a first view of the 3D image is produced based on the blue light. When the first RGB light source 200 emits red light for the second duration of the first time period $t_1$, the red light follows or substantially follows the path of the first light 208 represented in FIG. 2 (e.g., the same or substantially the same path of the blue light as represented by the lines 208 in FIG. 1). As a result, the first view of the 3D image is produced based on the red light for viewing at the exit pupil 216. Similarly, when the first RGB light source 200 emits green light for the third duration of the first time period $t_1$, the green light follows the path of the first light 208 (e.g., the same or substantially the same path of the blue light as represented by the lines 208 in FIG. 1). As a result, the first view of the 3D image is produced based on the green light for viewing at the exit pupil 216. In the example of FIG. 2, the light field display controller 126 instructs the first light source 200 to emit the blue light, the red light, and the green light for respective durations of the first time period $t_1$ based on a predefined duty cycle. For example, the light field display controller 126 can instruct the first light source 200 to emit the green light for 40% of the first time period $t_1$, red light for 35% of the first time period $t_1$, and green light for 25% of the first time period $t_1$. The duty cycle can differ based on, for example, the wavelength of light emitted, desired color(s) to be produced in connection with the 3D image(s), etc.

In the example of FIG. 2, the light field display controller 126 instructs the second light source 202 of the light source array 110 to emit light during a second time period $t_2$. In the example of FIG. 2, the second time period $t_2$ can occur after the first time period $t_1$ such that the first light source 200 and the second light source 202 are time-sequentially activated. As shown in FIG. 2, the second light source 202 emits a second light 220 during the second time period $t_2$. The second light 220 emitted by the second light source 202 can be a red light, a green light, a blue light, and/or another colored light based on a combination of red, blue, and/or green light based on the duty cycle for the second light source 202. The time-sequential emission of red, green, and blue light can be based on the ability of the human eye to perceive a mixture of red, green, and blue light into white light if the emission of the light is sequenced at a particular rate.

As shown in FIG. 2, the second light 220 emitted by the second light source 202 passes through the illumination optics 112 and is focused on the pixels 210, 212, 214 of the spatial light modulator 114 at a second angle different than the angle of the first light 208 emitted by the first light source 200. As a result, the pixels 210, 212, 214 of the spatial light modulator 114 are illuminated by the second light 220 of the second light source 202 at a different angle than when the pixels 210, 212, 214 are illuminated by the first light 208 of the first light source 200. The second light 220 emitted by the second light source 202 is deflected by the activated pixel(s) 210, 212, 214 of the spatial light modulator 114 and directed to the projection eyepiece optics 106. The projection eyepiece optics 106 (e.g., one or more lenses) transmit a second view (e.g., a second angular view) of the 3D image at the exit pupil 216 different from the first view of the 3D image based on the angle at which the second light source 202 emits the second light 220. Thus, the illumination of the spatial light modulator 114 at different angles via the light 208, 220 emitted by the respective first and second light sources 200, 202 creates different angular views of the 3D content. As discussed above, the second light source 202 emits, for instance, red light, blue light, and green light during the second time period $t_2$ based on instructions from the light field display controller 126 and a predefined duty cycle.

In the example of FIG. 2, the first light source 200, the second light source 202, the third light source 204, and the fourth light source 206 are time-sequentially activated with respect to the emission of light (e.g., red, green, and blue light) by each of the light sources 200, 202, 204, 206. Thus, during a third time period $t_3$, the third light source 204 emits light 222, which includes, for instance, red, green, and blue light for respective durations of the third time period $t_3$ based on the duty cycle. The light 222 emitted by the third light source 204 passes through the illumination optics 112, is focused on the pixel(s) 210, 212, 214 of the spatial light modulator 114, and is directed or steered to the projection eyepiece optics 106. As shown in FIG. 2, the light 222 emitted by the third light source 204 illuminates the spatial light modulator 114 at a third angle different than the angles of the light 208, 220 emitted by the respective first and second light sources 200, 202. As a result of emission of the light 222 (e.g., red light, green light, blue light) by the third light source 204 at the third angle, the projection eyepiece optics 106 transmit a third view (e.g., a third angular view) of the 3D image at the exit pupil 216.

Similarly, the projection eyepiece optics 106 transmit a fourth view (e.g., a fourth angular view) of the 3D image at the exit pupil 216 based on light 224 emitted by the fourth light source 206 (e.g., red, green, and blue light) during a fourth time period $t_4$. In the example of FIG. 2, the light 224 emitted by the fourth light source 206 illuminates the spatial light modulator 114 at a fourth angle different than the angles of the light emitted by the first light source 200, the second light source 202, and the third light source 204. The light 224 emitted by the fourth light source 206 during the fourth time period $t_4$ can include red light, green light, blue light, or another color light based on the duty cycle.

Thus, in the example of FIG. 2, four different views of the 3D content are created via the illumination of the spatial light modulator 114 at four different angles corresponding to the light emitted by the four light sources 200, 202, 204, 206 (e.g., the red, green, blue light emitted by each of the light sources during the respective time periods $t_1$, $t_2$, $t_3$, $t_4$). In particular, the light sources 200, 202, 204, 206 are time-multiplexed with the spatial light modulator 114 to create different images that provide different perspective views of the 3D content. For example, the 3D content may appear to be angled or tilted in one or more of the views. The brain of the user (e.g., the user 104 of FIG. 1) integrates the multiple views produced by the spatial light modulator 114 and transmitted by the projection eyepiece optics 106 such that the user sees the different views the 3D content. In examples disclosed herein, the light sources 200, 202, 204, 206 and the spatial light modulator 114 are electrically coupled to enable the sequencing of the red, green, and blue light to produce the 3D content. For example, the sequencing of red, green, and blue light is performed for each light source 200, 202, 204, 206, as each light source including red, green, and blue wavelengths. The sequencing of each light source 200, 202, 204, 206 creates a white light for a particular 2D image. In examples disclosed herein, each of the light sources 200, 202, 204, 206 is sequenced with the spatial light modulator to create a different perspective image of the corresponding 3D content.

As mentioned above, in the example of FIG. 2, the projection eyepiece optics 106 define the exit pupil 216, or the location where, when the user places his or her eye 218 at the exit pupil 216, each view of the 3D image produced by the spatial light modulator 114 is imaged onto the retina of the user's eye 218. The diameter of the exit pupil 216 is defined by a focal length of the projection eyepiece optics 106, a size of a focal plane image (e.g., the spatial light modulator 114 in the example of FIG. 2), and the F-number of an optical system defined by the light sources of the light source array 110, the spatial light modulator 114, and the projection eyepiece optics 106.

In the example of FIGS. 1 and 2, the F-number (F/#) of the optical system defined by the light sources of the light source array 110, the spatial light modulator 114, and the projection eyepiece optics 106 and the size of the spatial light modulator 114 define an etendue of the optical system, or the ability of the light source(s) 200, 202, 204, 206 to emit light and the ability of the spatial light modulator 114 to accept the light. To enable the spatial light modulator 114 to capture maximum or substantially maximum brightness of the light 208, 220, 222, 224 emitted by the light source(s) 200, 202, 204, 206, the etendue of the light source(s) 200, 202, 204, 206 should fit within the etendue of the spatial light modulator 114. In the example of FIG. 2, the amount of light that can be collected by the spatial light modulator 114 is based on, for instance, the angle range at which the micromirrors of the spatial light modulator 114 can move (e.g., +/−12°, +/−17°.

In the example of FIG. 2, the etendue and, thus, the F/# of the spatial light modulator 114 is divided by the light sources 200, 202, 204, 206 of the light source array 110, as each light source 200, 202, 204, 206 of the light source array 110 is smaller than a single light source at substantially maximum brightness. Because the F/# defines a size (e.g., a diameter) of the exit pupil 216, the exit pupil 216 is also sub-divided by the number of light sources 200, 202, 204, 206. For example, if the exit pupil diameter is 10 mm for a single light source, and there are two light sources, the exit pupil diameter for each of the two light sources is 5 mm. In examples disclosed herein, the light source(s) 200, 202, 204, 206, the spatial light modulator 114, the illumination optics 112, and the projection eyepiece optics 106 are optically coupled by the Etendue of the system and the size of the light source(s) 200, 202, 204, 206 are determined by the size of the spatial light modulator 114 and an acceptance cone angle of light (i.e., F/# or numerical aperture). The selected F/# determines the size of the illumination optics 112 and the projection eyepiece optics 106 that enables the illumination optics 112 and the projection eyepiece optics 105 to capture all of the light.

Thus, in the example of FIG. 2, the exit pupil 216 is divided by the number of light sources 200, 202, 204, 206 of the light source array 110, which results in the creation of smaller pupils or sub-pupils within the etendue of the spatial light modulator 114 (e.g., within the amount light capable of being collected by the spatial light modulator 114). In FIG. 2, the user looks through the exit pupil 216 and sees the exit pupil 216 divided by the number of light sources of the light source array 110 and including different images of the 3D content. The sequential activation of the light sources 200, 202, 204, 206 provides for time-multiplexed views of the 3D content. In the example of FIG. 2, the presentation of the different views of the 3D content is based on a refresh rate of the spatial light modulator 114 in providing (e.g., flashing) a particular view as the light from the respective light sources 200, 202, 204, 206 illuminates the spatial light modulator 114. For instance, the example spatial light modulator 114 can have a refresh rate of 240 Hz. In such examples, the spatial light modulator 114 can produce four views of the 3D content corresponding to the four light sources 200, 202, 204, 206 of the light source array 110 of FIG. 2 at a refresh rate of 60 Hz each. The user's brain integrates the images flashed by the spatial light modulator 114 such that the user perceives the different views of the 3D content.

As a result of the division of the exit pupil 216 into sub-pupils based on the number of light sources 200, 202, 204, 206 of the light source array 110, each sub-pupil has a slow F/# and, thus, a long depth of field. Therefore, the 3D content is displayed with increased depth. The increased depth of field of the display device 102 of FIGS. 1 and 2 can reduce instances of vergence-accommodation conflict experienced by the user of the display device 102. Vergence-accommodation conflict can occur when the user's brain receives mismatched information about the distance of a virtual 3D object, or vergence, and focusing distance, or accommodation. For example, when a 3D object appears to be close to a user's face, but the image is optically farther away, the user's eyes may focus on the wrong distance. However, when the depth of field is increased, the user's eyes converge at a distance from the display such that the 3D object appears to pop into or out of the display and without the need for accommodation or focus. Thus, the near-field eye display device 102 of FIGS. 1 and 2 provides for improved display of different views of 3D content.

Figure 3:
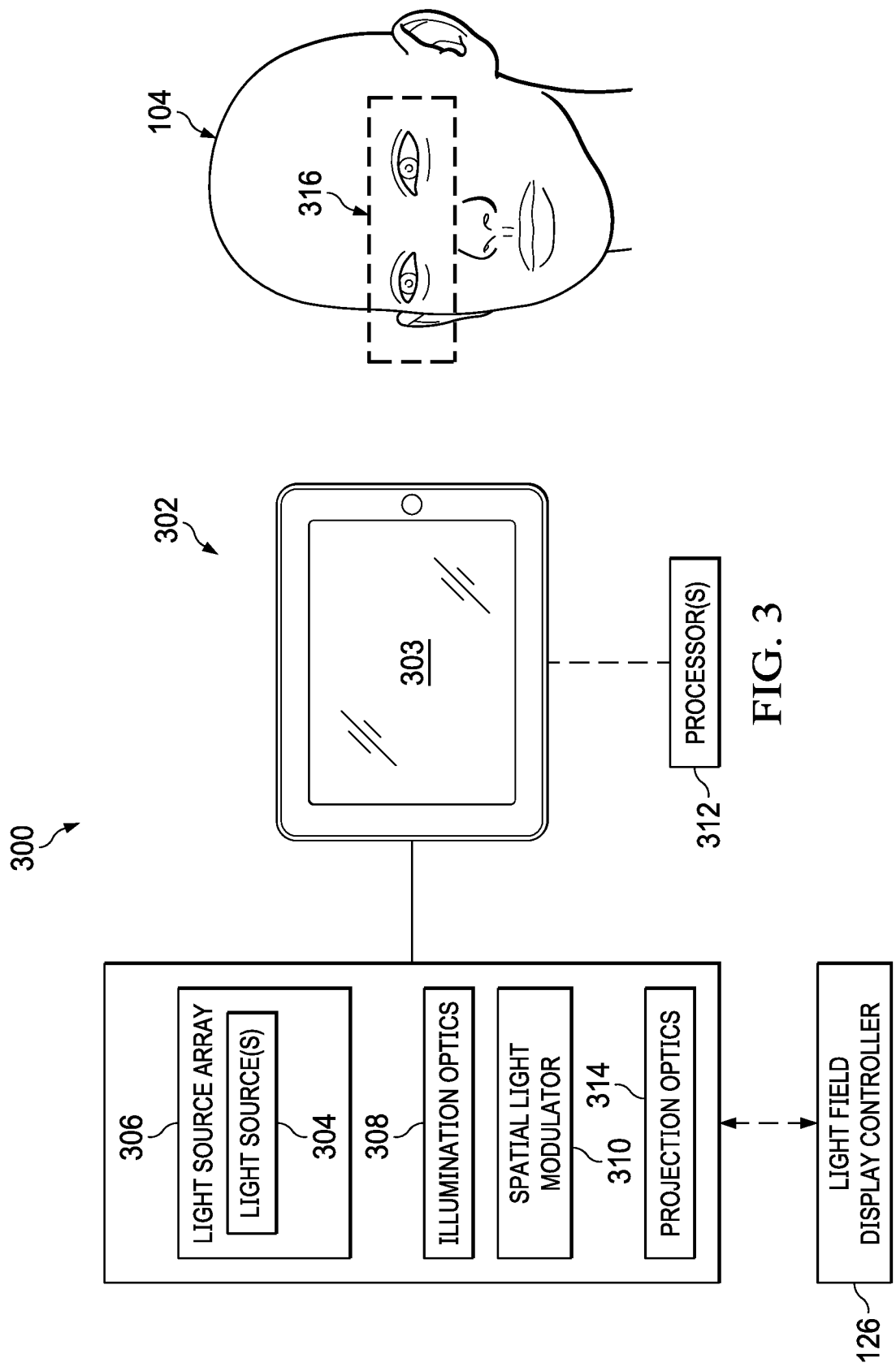
FIG. 3 illustrates another example system constructed in accordance with teachings of this disclosure and including a surface-mounted display device for presenting 3D digital content and the light field display controller for controlling presentation of the content.

FIG. 3 illustrates an example system 300 constructed in accordance with teachings of this disclosure for rendering multiple views of 3D content via a display device 302, where the display device 302 is a surface-mounted display device such as a direct view monitor, a tabletop light field display, or another non-wearable display device. The example display device 302 of FIG. 3 includes a screen 303 to enable a user (e.g., the user 104 of FIG. 1) to view 3D content. The display device 302 includes RGB light source(s) 304 defining a light source array 306. The example light source(s) 304 can include LEDs, microLEDs, OLEDs, lasers, etc. In some examples, the light source array 306 of the surface-mounted display device 302 includes a spatial light modulator that can pattern light and simulate many light sources, as described below in connection with FIG. 5.

The display device 302 of FIG. 3 includes illumination optics 308. The illumination optics 308 include one or more lenses to direct light emitted by the light source(s) 304 to a spatial light modulator 310 of the display device 302. The example spatial light modulator 310 of FIG. 3 can include a digital micromirror device (DMD). In the example of FIG. 3, the spatial light modulator 310 selectively directs light emitted by the light source(s) 304 and focused on, for example, mirrors (e.g., pixels) of the spatial light modulator 310 by the light source(s) 304 to generate images of the 3D content.

The display device 302 of FIG. 3 includes one or more semiconductor-based processors 312 to control operation of the light source(s) 304 and/or the spatial light modulator 310. The display device 302 can include a battery to provide power to the processor(s) 312 and/or other components of the display device 302.

In other examples, one or more of the processors is separate from the display device 302. For example, one or more processor(s), server(s), and/or virtual machine(s) implemented by a cloud-based device (e.g., the cloud-based device 124 of FIG. 1) can generate instructions to control the light source(s) 304 and/or the spatial light modulator 310 of the display device 302 via communication paths (e.g., via WiFi, cellular, Bluetooth, and/or other communication protocols). In other examples, a processor of another non-wearable or wearable device (e.g., the processor 120 of the user device 122 of FIG. 1) may be in communication with display device 302 (e.g., via WiFi, cellular, Bluetooth, and/or communication protocols). In some examples, the processor(s) 312 of the display device 302 is communicatively coupled to one or more other processors (e.g., a cloud-based device 124, the processor 120 of the user device 122 of FIG. 1) via one or more wired or wireless connections.

In the example of FIG. 3, the light source(s) 304 and the spatial light modulator 114 are controlled by the example light field display controller 126. One of more components of the example light field display controller 126 can be implemented by software executed on the processor(s) 312 of the display device 302, the processor of another user device (e.g., the processor 120 of the user device 122 of FIG. 1), and/or a cloud-based device (e.g., the cloud-based device 124 of FIG. 1).

In the example of FIG. 3, the light field controller 126 time-sequentially activates the light source(s) 304 to emit light to cause different views of 3D content to be produced via the spatial light modulator 310. When a first one of the light sources 304 is activated, the light emitted by the first light source 304 (e.g., red light, blue light, and/or green light based on a predefined duty cycle) is focused on the spatial light modulator 310 (e.g., via the illumination optics 308) at a first angle. When a second one of the light sources 304 is activated, the light emitted by the second light source 304 focused on the spatial light modulator 310 at a second angle different than the first angle at which light from the first light source 304 is focused on the spatial light modulator 310.

The spatial light modulator 310 reflects at least some portion of the light from the light source(s) 304 to projection optics 314 of the display device 302. The projection optics 314 project different views of 3D content based on the different angles at which the light emitted by the respective light sources 304 is focused on the spatial light modulator 310. In the example of FIG. 3, the projection optics 314 include one or more lenses to expand the image(s) provided by the spatial light modulator 310 for viewing via the screen 303 of the display device 302. In some examples, the example screen 303 includes a large field lens such as a Fresnel lens. In some examples, the screen 303 includes a diffuser. In the example of FIG. 3, when a user places his or her eyes at an eyebox location 316 (e.g., a projected exit pupil or viewing position from the screen 303 where the user sees the image(s)), the user will see different views of the 3D content. In the example of FIG. 3, the different views of the 3D content provide for a motion parallax effect such that viewer perceives, for instance, that he or she is looking around a 3D object or seeing different sides of the object.

Figure 4:
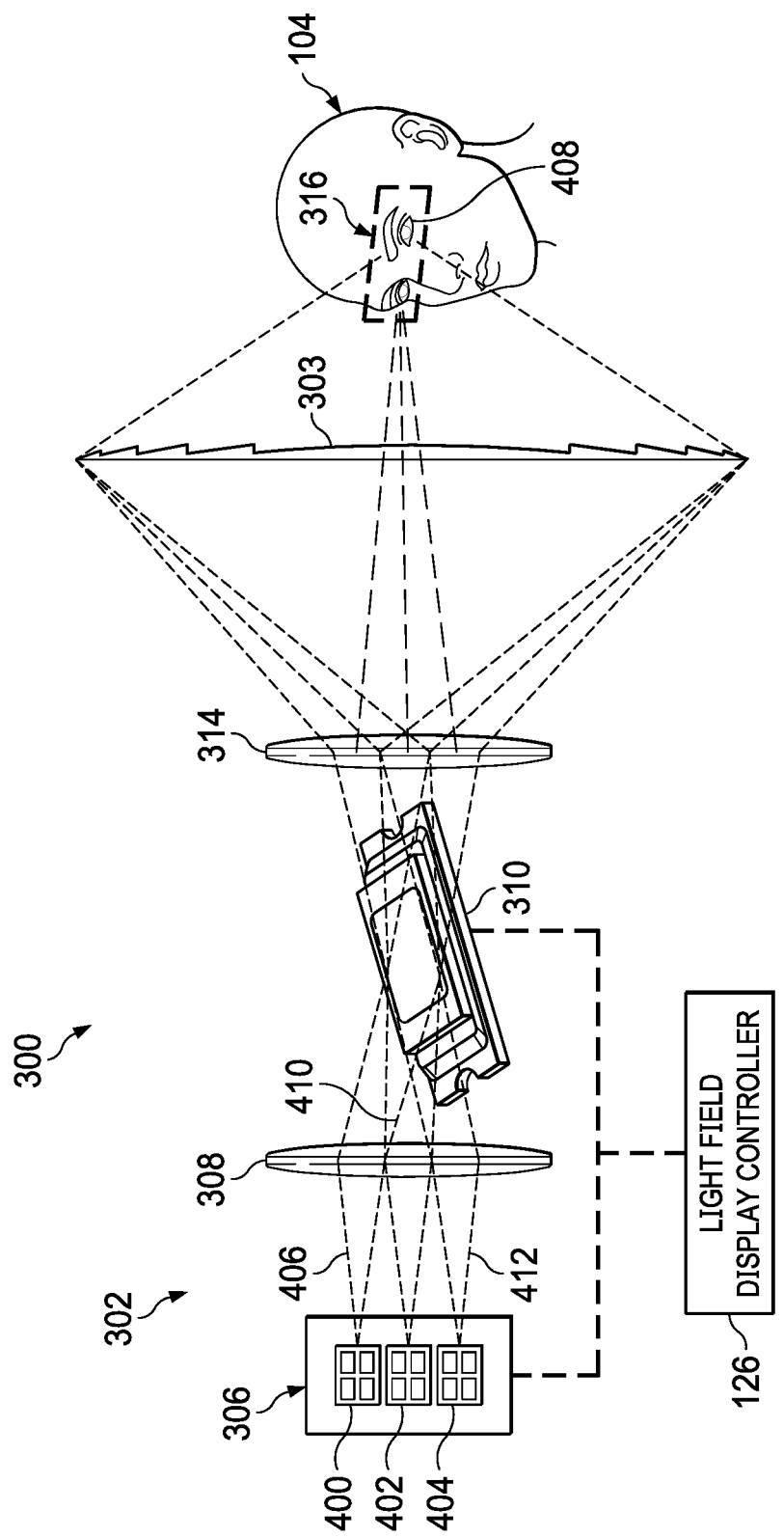
FIG. 4 is a diagram illustrating the system of FIG. 3.

FIG. 4 is a diagram illustrating the system 300 of FIG. 3. As shown in FIG. 4, the light source array 306 includes a plurality of light sources (e.g., the light sources 304 of FIG. 3), including a first light source 400, a second light source 402, and a third light source 404. The example light source array 306 can include additional or fewer light sources than shown in FIG. 4. The example light sources 400, 402, 404 include RGB light sources that are sequenced to create a white light for a particular 2D image based on the red, green, and blue wavelengths and sequenced with the spatial light modulator 310 to generate different perspective images of corresponding 3D content.

As shown in FIG. 4, the first light source 400 emits a first light 406 at a first time period $t_1$ based on instructions received from the light field display controller 126. The first light 406 can include, for example, a red light, a green light, a blue light, or a light color based on a combination thereof. As shown in FIG. 4, the first light 406 passes through the illumination optics 308. The illumination optics 308 directs the first light 406 on the spatial light modulator 310 at a first angle. As discussed above in connection with the spatial light modulator 114 of FIGS. 1 and 2, the spatial light modulator 310 of FIG. 3 includes pixels (e.g., mirrors) that are selectively activated by the light field display controller 126 to deflect the light received from the light sources 400, 402, 404 toward the projection optics 314 to cause an image to be provided or transmitted by the spatial light modulator 310. As a result of emission of the light 406 by the first light source 400 at the first angle, the projection optics 314 project a first view (e.g., a first angular view) of a 3D image via the screen 303 at the eyebox 316. In the example of FIG. 3, a user of the surface-mounted display device 302 sees the first view of the 3D content when the user's eye 408 is placed at the eyebox 316.

During the first time period $t_1$, the example first light source 400 emits, for instance, red light for a first duration of the first time period $t_1$, green light for a second duration of the first time period $t_1$, and blue light for a third duration of the first time period $t_1$ based on a predefined duty cycle substantially as described above in connection with the light sources 200, 202, 204, 206 of FIG. 2 As a result, the first view (e.g., the first angular) of the 3D image is produced based on the red light, the green light, and the blue light during the first time period $t_1$.

In the example of FIG. 4, the light field display controller 126 instructs the second light source 402 to emit a second light 410 during a second time period $t_2$, where the first light source 400 and the second light source 402 are time-sequentially activated with respect to the emission of light by the light sources 400, 402. In the example of FIG. 4, the light field display controller 126 instructs the second light source 202 to emit, for instance, red light, green light, and blue light during the second time period $t_2$ based on a predefined duty cycle. The second light 410 emitted by the second light source 402 passes through the illumination optics 308 and is focused on the pixels of the spatial light modulator 310 at a second angle different than the first angle of the light 406 emitted by the first light source 400. The second light 410 is deflected by the pixels of the spatial light modulator 310 and directed to the projection optics 314. As a result of emission of the light 410 by the second light source 402 at the second angle, the projection optics 314 project a second view (e.g., a second angular view) of the 3D image via the screen 303 at the eyebox 316.

In the example of FIG. 4, the light field display controller 126 instructs the third light source 404 to emit a third light 412 during a third time period $t_3$. Thus, in the example of FIG. 3, the first light source 400, the second light source 402, and the third light source 404 are time-sequentially activated with respect to the emission of light by the light sources 400, 402, 404. In the example of FIG. 4, the light field display controller 126 instructs the third light source 404 to emit, for instance, red light, green light, and blue light during the third time period $t_3$ based on a predefined duty cycle. The light 412 emitted by the third light source 404 passes through the illumination optics 308 and is focused on the pixels of the spatial light modulator 310 at a third angle different than the angles of light 406, 410 emitted by the respective first and second light sources 400, 402. The third light 412 is deflected by the pixels of the spatial light modulator 310 and directed to the projection optics 314. As a result of emission of the light 412 by the third light source 404 at the third angle, the projection optics 314 project a third view (e.g., a third angular view) of the 3D image via the screen 303 at the eyebox location 316.

Thus, in the example of FIG. 4, three different views of the 3D content are created via the illumination of the spatial light modulator 310 at three different angles based on the time-sequential emission of light by the respective light sources 400, 402, 404. The brain of the user 104 integrates the multiple views produced by the spatial light modulator 310 such that the user 104 views different perspectives of the 3D content. The spatial light modulator 310 provides the three views corresponding to the three light sources 400, 402, 404 based on a predefined refresh rate for the spatial light modulator 310.

In the example of FIG. 4, the eyebox 316, or a projected exit pupil, is divided by the number of light sources to create smaller pupils or sub-pupils within the etendue of the surface-mounted display device 302 of FIGS. 3 and 4 (e.g., within the etendue of the spatial light modulator 310) substantially as described above in connection with the near-field light display device 102 of FIGS. 1 and 2. For example, in FIG. 4, the eyebox 316 is divided into three sub-pupils based on the three light sources 400, 402, 404. As a result, the eyebox 316 includes multiple sub-pupils for the different views of the 3D content. In FIG. 4, each sub-pupil produces the full resolution of the spatial light modulator 310. The division of the eyebox 316 into sub-pupils based on the number of light sources increases a depth of field of the views produced without loss of resolution as compared to approaches that use a lens array including individual lenses to create 3D views.

Figure 5:
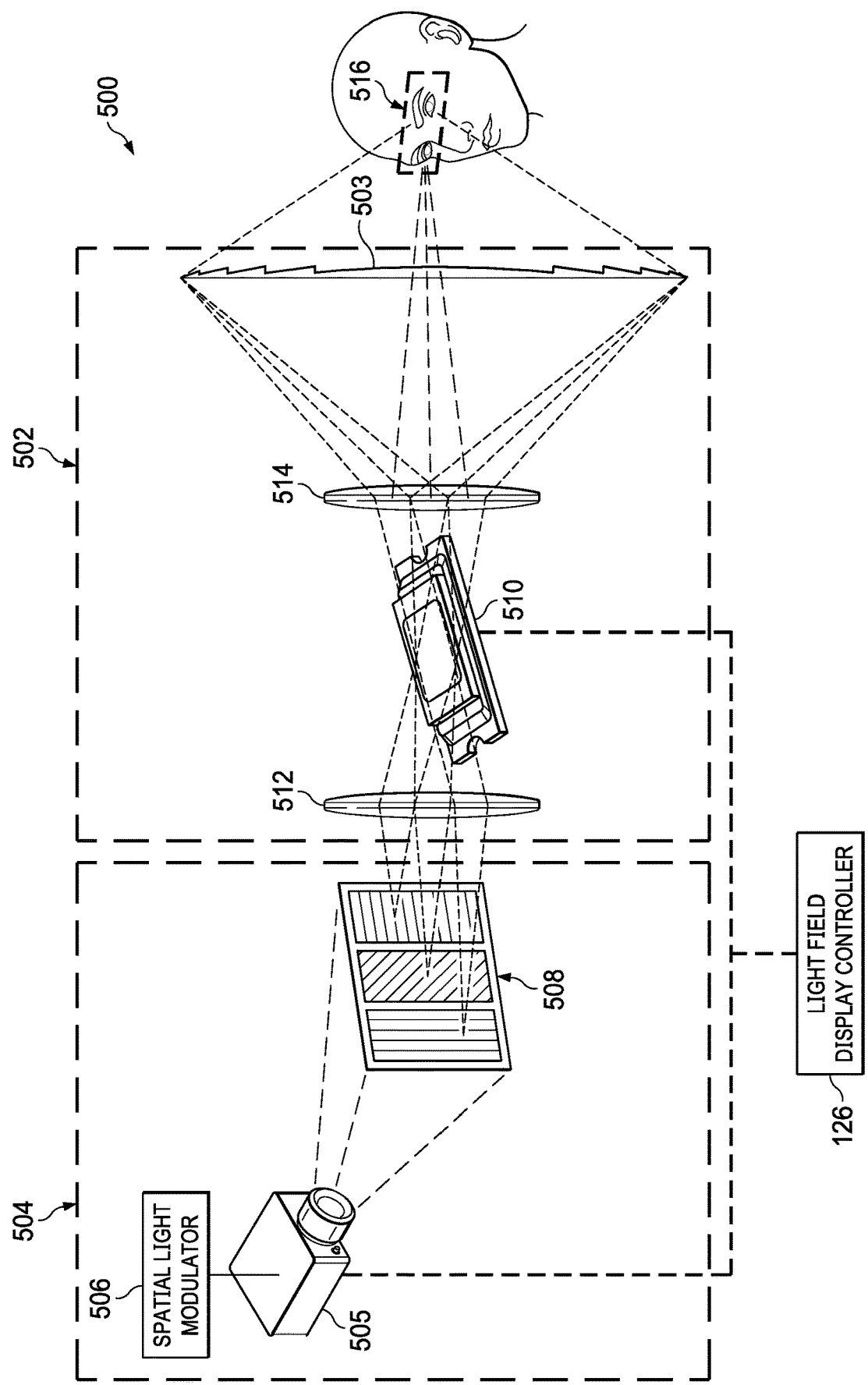
FIG. 5 illustrates another example system constructed in accordance with teachings of this disclosure and including a surface-mounted display device for presenting 3D digital content and the light field display controller for controlling presentation of the content.

FIG. 5 illustrates an example system 500 constructed in accordance with teachings of this disclosure for rendering multiple views of 3D content via a display device 502, where the display device 502 is direct view monitor, a tabletop light field display, or another non-wearable display device. One or more components of the example display device 502 of FIG. 5 can be the same or substantially the same as the display device 302 of FIGS. 3 and 4 (e.g., the screen 303, the illumination optics 308, the spatial light modulator 310, the projection optics 314, the processor(s) 312).

The display device 502 of FIG. 5 includes a screen 503 by which a user (e.g., the user 104 of FIG. 1) views content. The system 500 of FIG. 5 includes a backlighting unit 504. The backlighting unit 504 includes a projection engine 505 including a first spatial light modulator 506. The first spatial light modulator 506 produces a projected image 508. In the example of FIG. 5, the projected image 508 represents a light source array (e.g., similar to the light source array 306 of FIGS. 3 and 4). In some examples, each pixel of the projection engine 505 to be used as light source includes red, green, and blue pixels superimposed. For instance, the projected image 508 can include a red square (or other projected image in red) corresponding to a red light source based on activation of a first pixel of the projection engine. The projected image 508 can include a green square corresponding to a green light source based on activation of the first pixel or another pixel of the projection engine. The projected image 508 can include a blue square corresponding to a blue light source. Thus, the projection engine 505 recreates an LED or microLED array via the projected image 508 in that certain pixel(s) of the projection engine 505 are activated to serve as light source(s). The projection engine 505 can create as many RGB light sources for the display device 502 via the projected image 508 as there are pixels associated with the projection engine 505. For instance, in examples where the projection engine 505 is a 1080p projector, the projection engine 505 would have 1920×1080 pixels, each of which could serve as an individual light source. Thus, the projection engine 505 provides means for emitting light in the system 500 of FIG. 5.

In the example of FIG. 5, each pixel of the projected image 508 can be used as a light source to emit light, where the emitted light is received by a second spatial light modulator 510 (e.g., a DMD) of the display device 502. In particular, the light field display controller 126 controls the first spatial light modulator 506 of the projection engine 505 to selectively turn on and off the pixels of the projection engine 505 to create the projected image 508 based on a predefined pattern. The pattern can define a particular time-based sequence in which the pixels should be activated such that light source(s) represented in the projected image 508 selectively emit light (e.g., similar to the sequential activation of the light sources 400, 402, 404 of the light array 306 of FIGS. 3 and 4). The light provided by the individual light source(s) of the projected image 508 passes through illumination optics 512. The light is focused on the pixels of the second spatial light modulator 510 at different angles substantially as described above in connection with the system 300 of FIGS. 3 and 4. The pixels of the second spatial light modulator 510 selectively deflect the light emitted by the projected image 508, which results in the transmission of a 3D image. The backlighting unit 504 and the second spatial light modulator 510 can be controlled via one or more processors, such as the processor(s) 312 of the surface-mounted display device 302 of FIG. 3.

The system 500 of FIG. 5 includes projection optics 514. As a result of emission by the light at different angles, the projection optics 514 project different views (e.g., a first angular view, a second angular view) of a 3D image via the screen 503. In the example of FIG. 5, the user views the different views of the 3D image at an eyebox 516, substantially as discussed above in connection with FIGS. 3 and 4.

Thus, in the example of FIG. 5, the backlighting unit 504 including the first spatial light modulator 506 and the projected image 508 generated therefrom can pattern light and simulate a multitude of light sources. Put another way, the backlighting unit 504 can provide for an increased number of light sources that generate light within the etendue of the second spatial light modulator 510. For instance, an etendue of the second spatial light modulator 510 (e.g., a DMD) may accept light from a one millimeter light source. If a light source has a size of one-half millimeter, the number of light sources that accommodate the etendue of the light source may be limited to two one-half millimeter light sources. In the example of FIG. 5, the number of available light sources is increased as a result of the projection engine 505 and the pixels associated therewith, which can provide for up to millions of light sources via the projected image 508 (e.g., based on refresh rate(s) of the spatial light modulator(s) 506, 510). Thus, the display device 502 of FIG. 5 provides for an increased number of light sources within the etendue of the second spatial light modulator 510 and avoids limitations that arise with respect to, for instance, the size of individual lenses in a lens array. The increased number of available light sources in the example of FIG. 5 results in increased angular resolution of the 3D content displayed via the display device 502. The increased angular resolution of the 3D content can provide for sharper images (e.g., more clearly defined edges of a 3D object).

Figure 6B:
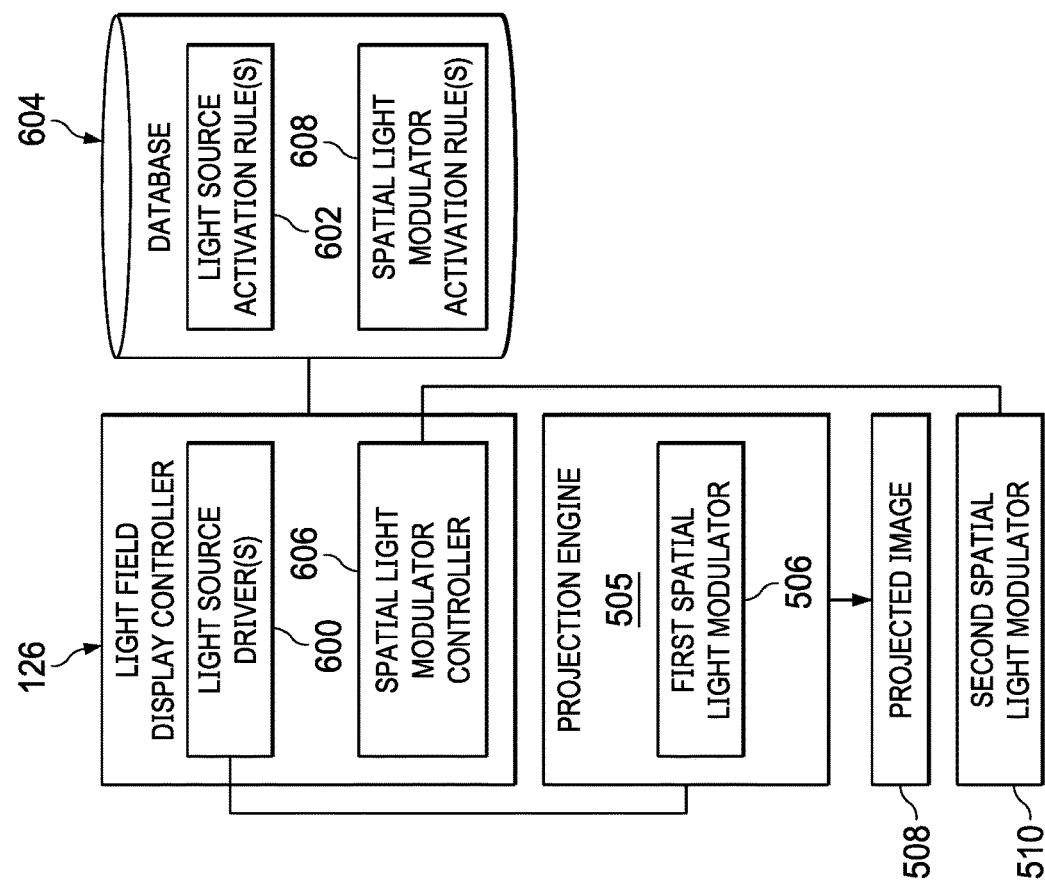
FIG. 6B is a block diagram of an example implementation of the light field display controller in connection with the system of FIG. 5.
Figure 6A:
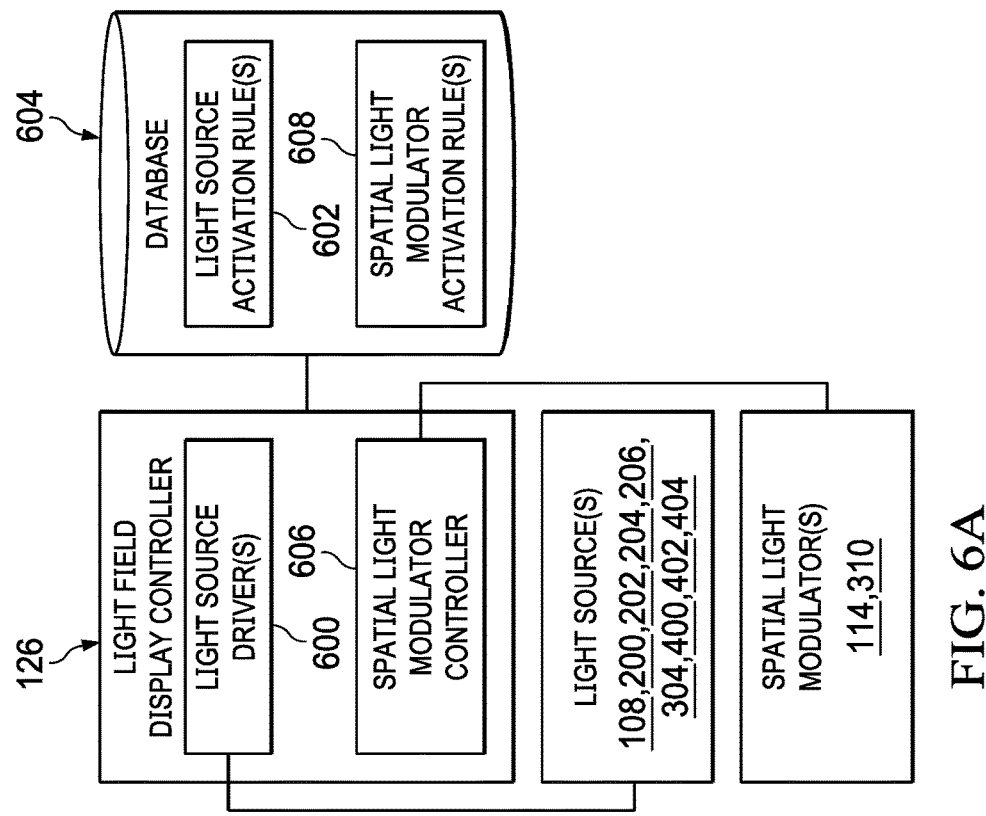
FIG. 6A is a block diagram of an example implementation of the light field display controller in connection with the system of FIG. 1 and/or the system of FIG. 3.

FIG. 6A is a block diagram of the light field display controller 126 of FIGS. 1-4. As mentioned above, the light field display controller 126 is constructed to control operation of the light sources 108, 110, 200, 202, 204, 206, 304, 306, 400, 402, 404 of FIGS. 1-4 and the spatial light modulator(s) 114, 310 of FIGS. 1-4 to produce different views (e.g., different angular views) of 3D content via the display devices 102, 302 of FIGS. 1-4. In the example of FIG. 6A, the light field display controller 126 is implemented by one or more processor(s) (e.g., the processor 116 of the wearable display device 102 of FIG. 1, the processor 120 of the user device 122 of FIG. 1, the cloud-based device 124 of FIG. 1, the processor(s) 312 of the surface-mounted display device 302 of FIG. 3). In some examples, one or more components of the light field display controller 126 is implemented via a cloud-computing environment and one or more other parts of the analysis is implemented by the processor of the display device or another user device (e.g., the processor 116 of the wearable display device 102 of FIG. 1, the processor(s) 312 of the surface-mounted display device 302).

The light field display controller 126 includes light source driver(s) 600. The example light source driver(s) 600 control activation of the respective light sources 108, 110, 200, 202, 204, 206, 304, 306, 400, 402, 404, of FIGS. 1-4. In such examples, the light source driver(s) 600 cause the light sources 108, 110 200, 202, 204, 206, 304, 306, 400, 402, 404 to emit light. The light source driver(s) 600 control activation of the light source(s) 108, 110, 200, 202, 204, 206, 304, 306, 400, 402, 404 based on one or more light source activation rules 602. The light source activation rule(s) 602 are stored in a database 604. In some examples, the light field display controller 126 includes the database 604. In other examples, the database 604 is located external to the light field display controller 126 in a location accessible to the light field display controller 126 as shown in FIG. 6A.

The example light source activation rule(s) 602 can be defined based on one or more user inputs. The light source activation rule(s) 602 define, for example, a sequence in which each of the light sources 108, 110, 200, 202, 204, 206, 304, 306, 400, 402, 404 are to be activated to emit light and a duration of time for which each light source 108, 110, 200, 202, 204, 206, 304, 306, 400, 402, 404 is to be activated. The light source activation rule(s) 602 define the duty cycle for the RGB light source(s) 108, 200, 202, 204, 206, 304, 400, 402, 404, or the duration of time for which a respective light source emits red light, green light, blue light, or another color light when the light source is activated. The light source activation rule(s) 602 can define when the light source(s) 108, 110, 200, 202, 204, 206, 304, 306, 400, 402, 404 should be activated based on, for instance, data indicating that the display device 102, 302 has been powered on such as battery status data, that there has been selection of content by the user, etc.

The light source driver(s) 600 of the light field display controller 126 of FIG. 6A instructs the respective light sources 108, 110, 200, 202, 204, 206, 304, 306, 400, 402, 404 of the display devices 102, 302 of FIGS. 1-4 to emit light based on the light source activation rule(s) 602. The light source driver(s) 600 communicate with the light sources 108, 110, 200, 202, 204, 206, 304, 306, 400, 402, 404 via one or more wired or wireless communication protocols.

The light field display controller 126 includes a spatial light modulator controller 606. The example spatial light modulator controller 606 controls operation of the spatial light modulator(s) 114, 310, of the display devices 102, 302 of FIGS. 1-4. For instance, the spatial light modulator controller 606 of FIG. 6A controls operation of the spatial light modulator(s) 114, 310 (FIGS. 1, 3) with respect to which pixels (e.g., mirrors) are activated to deflect light toward the projection optics 106, 314 and which pixels deflect light away from the projection optics 106, 314. The spatial light modulator controller 606 of FIG. 6A controls the activation of the pixels of the spatial light modulator 114, 310 based on one or more spatial light modulator activation rules 608. The spatial light modulator activation rules 608 define which pixels of the spatial light modulator 114, 310 should be activated based the image(s) of the 3D content to be produced. The spatial light modulator activation rules can define when the spatial light modulator 114, 310 should be activated based on, for instance, data indicating that the display device 102, 302 has been powered on, that there has been selection of content by the user, etc. The spatial light modulator activation rule(s) 608 can be defined by user input(s) and stored in the database 604.

FIG. 6B is a block diagram of the light field display controller 126 of FIG. 5. As mentioned above, the light field display controller 126 is constructed to control operation of the projection engine 505 including the first spatial light modulator 506 and the second spatial light modulator 510 of the display device 502 of FIG. 5 to produce different views (e.g., different angular views) of 3D content via the display device 502. In the example of FIG. 6B, the light field display controller 126 is implemented by one or more processor(s) (e.g., the processor(s) 312 of the surface-mounted display device 302 of FIG. 3). In some examples, one or more components of the light field display controller 126 is implemented via a cloud-computing environment and one or more other parts of the analysis is implemented by the processor of the display device or another user device (e.g., the processor 116 of the wearable display device 102 of FIG. 1, the processor(s) 312 of the surface-mounted display device 502).

In the example of FIG. 6B, the light source driver(s) 600. The example light source driver(s) 600 control activation of the projection engine 505. Based on the light source activation rule(s) 602, the light source driver(s) 600 instruct the projection engine 505 including the first spatial light modulator 506 to create a particular pattern of light based on time-based activation of the pixel(s) of the projection engine 505. The projection engine 505 emits the projected image 508 that corresponds to the activated pixel(s) (e.g., a red square, a blue square) based on the pattern or time-based sequence. As a result, the projected image 508 simulates a light array that provides light source(s) for the system 500. As described above, the light source activation rule(s) 602 can be based on user input(s) and stored in the database 604. In addition to the light pattern to be created by the projection engine 505, the light source activation rule(s) 602 can define when the projection engine 505 should be activated to emit the projected image 508 based on, for instance, indication(s) that the display device 502 has been powered on, that there has been selection of content by the user, etc. The light source driver(s) 600 can communicate with the projection engine 505 via one or more wired or wireless communication protocols In the example of FIG. 6B, the spatial light modulator controller 606 controls operation of the second spatial light modulator 510 of the display device 502 of FIG. 5. For instance, the spatial light modulator controller 606 controls operation of the second spatial light modulator 510 with respect to which pixels (e.g., mirrors) are activated to deflect light provided by the projected image 508 toward the projection optics 514 (FIG. 5) and which pixels deflect light away from the projection optics 514. The spatial light modulator controller 606 of FIG. 6 controls the activation of the pixels of the second spatial light modulator 510 based on the spatial light modulator activation rule(s) 608. The spatial light modulator activation rule(s) 608 define which pixels of the second spatial light modulator 510 should be activated based the image(s) of the 3D content to be produced and when the second spatial light modulator 510 should be activated (e.g., based on data indicating that the display device 502 has been powered on, that there has been selection of content by the user, etc.). As described above, the spatial light modulator activation rule(s) 608 can be defined by user input(s) and stored in the database 604.

While an example manner of implementing the light field display controller of FIGS. 1-5 is illustrated in FIG. 6A and FIG. 6B, one or more of the elements, processes and/or devices illustrated in FIG. 6A and/or FIG. 6B may be combined, divided, re-arranged, omitted, eliminated and/or implemented in any other way. Further, the light source activator 600, the database 604, the spatial light modulator controller 606 and/or, more generally, the light field display controller 126 of FIG. 6A and/or FIG. 6B may be implemented by hardware, software, firmware and/or any combination of hardware, software and/or firmware. Thus, for example, any of the example light source activator 600, the example database 604, the spatial light modulator controller 606 and/or, more generally, the light field display controller 126 of FIG. 6A and/or FIG. 6B could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the light source activator 600, the example database 604, and/or the spatial light modulator controller 606 is/are hereby expressly defined to include a non-transitory computer readable storage device or storage disk such as a memory, a digital versatile disk (DVD), a compact disk (CD), a Blu-ray disk, etc. including the software and/or firmware. Further still, the light field display controller 126 of FIG. 6A and/or FIG. 6B may include one or more elements, processes and/or devices in addition to, or instead of, those illustrated in FIG. 6A and/or FIG. 6B, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7:
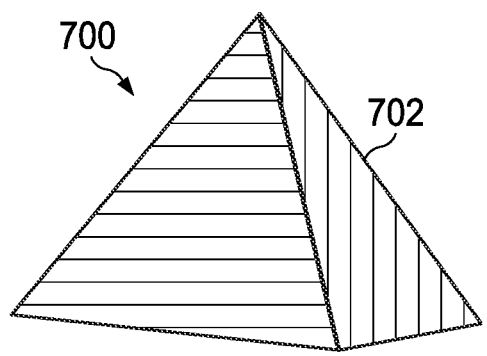
FIGS. 7-9 illustrate example views of a 3D object generated via the example system of FIG. 1, the example system of FIG. 3, and/or the example system of FIG. 5.
Figure 8:
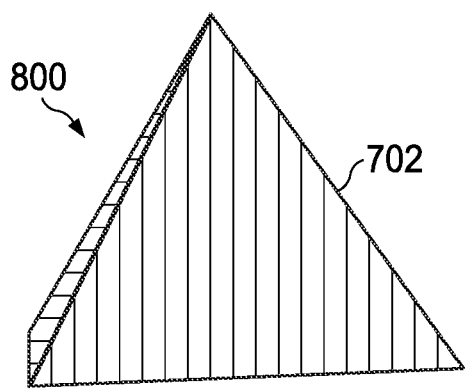
Figure 9:
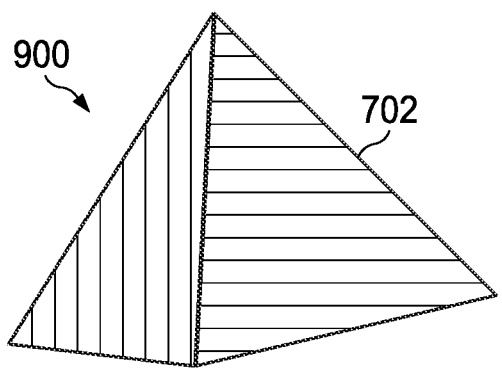

FIGS. 7-9 illustrate an example views of 3D content that can be produced by the system 100 of FIGS. 1 and 2 for viewing by a user (e.g., the user 104) via the near-field display device 102, the system 300 of FIGS. 3 and 4 for viewing by a user via the example surface-mounted display device 302, and/or the system 500 of FIG. 5 for viewing by a user via the example surface-mounted display device 502. For instance, FIG. 7 illustrates a first view 700 (e.g., a first angular view) of example 3D content 702. FIG. 8 illustrates a second view 800 (e.g., a second angular view) of the example 3D content 702, and FIG. 9 illustrates a third view 900 (e.g., a third angular view) of the example 3D content 702. The different views 700, 800, 900 can be generated by the spatial light modulator 114, 310, 510 of the systems 100, 300, 500 when light from the respective light sources 108, 110, 200, 202, 204, 206, 304, 306, 400, 402, 404 of the systems 100, 300 of FIG. 1-4 and/or the light associated with the projected image 508 in the system of FIG. 5 is deflected by the spatial light modulator 114, 310, 510. As described above, the light field display controller 126 time-sequentially activates the respective the light sources 108, 110, 200, 202, 204, 206, 304, 306, 400, 402, 404 to emit light at different angles, which causes the spatial light modulator 114, 310 of FIGS. 1-4 to provide the different views 700, 800, 900 of the 3D content 702. In other examples, the light field display controller 126 instructs the projection engine 505 to emit the projected image 508, which serves as a light source array in the system 500. The second spatial modulator 510 of FIG. 5 provides the different views 700, 800, 900 of the 3D content based on the light provided by the projected image 508. The spatial light modulator 114, 310, 510 of the systems 100, 300, 500 provides each view 700, 800, 900 based on a predefined refresh rate.

The views 700, 800, 900 can be viewed by the user via the eyebox 216, 316, 516, which includes multiple sub-pupils for the different views 700, 800, 900. The user's brain stiches the multiple views of the 3D content 702 together, which gives the user the impression that the user is looking around the 3D content 702. Although three views 700, 800, 900 are shown in the examples of FIGS. 7-9, additional views of the example 3D content 702 can be produced by the spatial light modulator 114, 310, 510 of the systems 100, 300, 500 based on, for instance, the number of light sources (e.g., the light source array 306 or associated with the projected image 508) and the angle at which the light is focused on the spatial light modulator 114, 310, 510.

Figure 10:
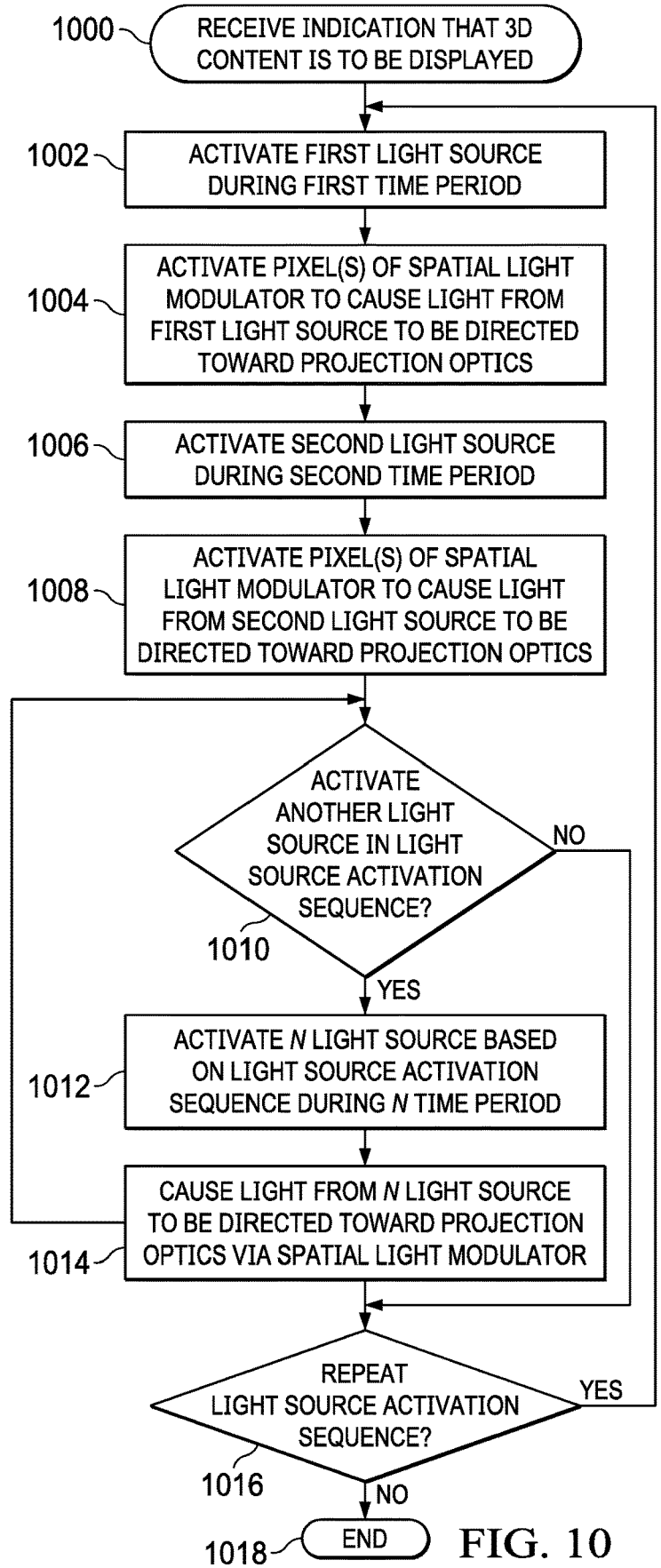
FIG. 10 is a flowchart representative of machine readable instructions which may be executed to implement the example light field display controller of FIG. 6A.
Figure 11:
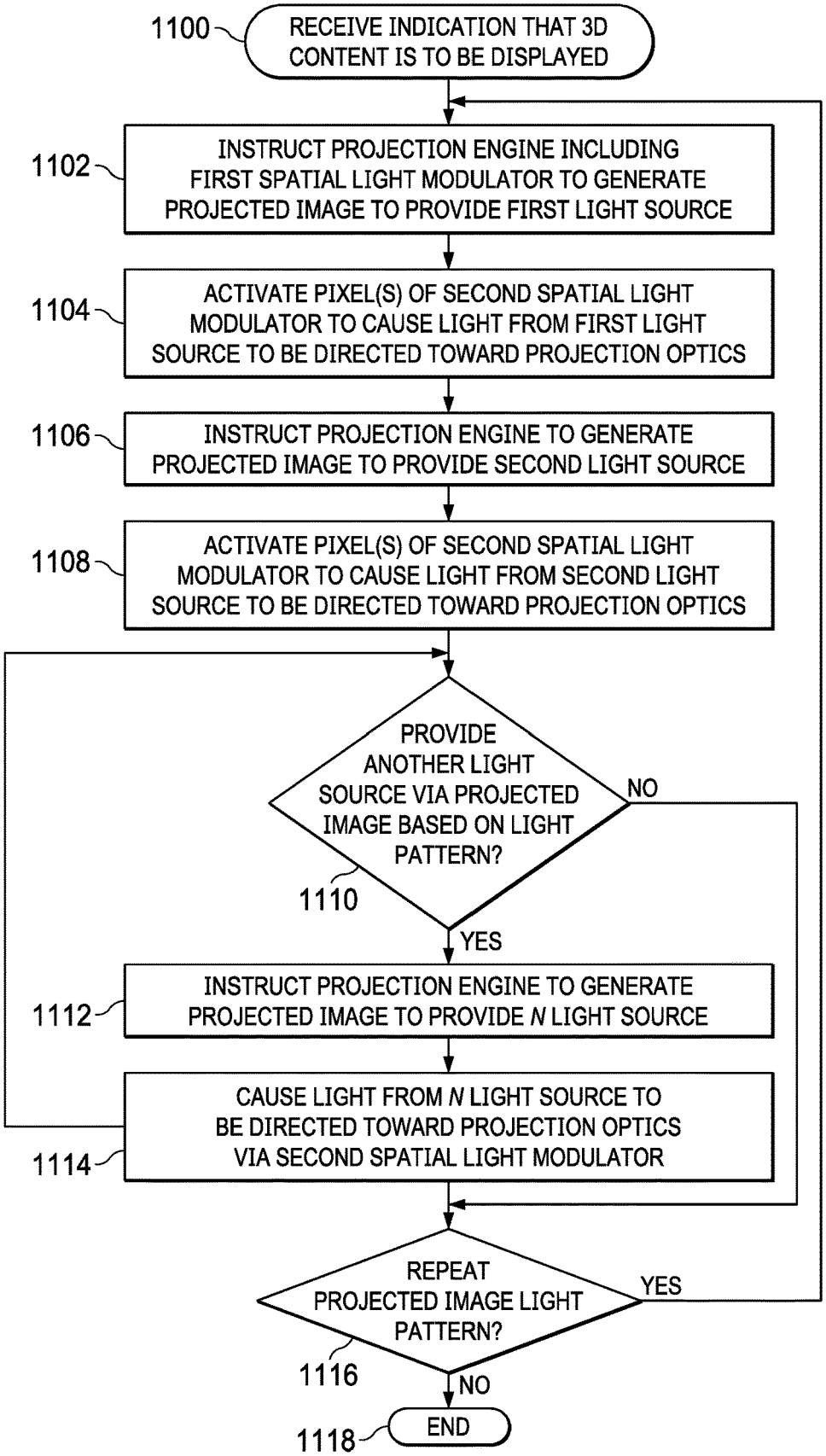
FIG. 11 is a flowchart representative of machine readable instructions which may be executed to implement the example light field display controller of FIG. 6B

Flowcharts representative of example hardware logic, machine readable instructions, hardware implemented state machines, and/or any combination thereof for implementing the light field display controller 126 of FIG. 6A and/or FIG. 6B are shown in FIGS. 10 and 11. The machine readable instructions may be one or more executable programs or portion(s) of an executable program for execution by a computer processor such as the processor 126 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 126, but the entire program and/or parts thereof could alternatively be executed by a device other than the processor 126 and/or embodied in firmware or dedicated hardware. Further, although the example program is described with reference to the flowcharts illustrated in FIG. 10 and/or FIG. 11, many other methods of implementing the light field display controller 126 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the described machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 10 and/or FIG. 11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

FIG. 10 is a flowchart representative of example machine readable instructions which, when executed causes the light field display controller 126 of FIGS. 1, 2, 3, 4, and/or 6A to control operation of light source(s) (e.g., the light sources 108, 110, 200, 202, 204, 206, 304, 306, 400, 402, 404 of FIGS. 1-4) and spatial light modulator(s) (e.g., the spatial light modulator(s) 114, 310 of FIGS. 1-4) of a display device (e.g., the display device 102, 302 of FIGS. 1-4) to produce different angular or perspective views of 3D content. The example instructions of FIG. 10 can be executed by the light field display controller 126 of FIGS. 1, 2, 3, 4, and/or 6A.

The example instructions of FIG. 10 begin with the light field display controller 126 receiving an indication that 3D content is to be presented via the display device 102, 302 (block 1000). The light field display controller 126 can receive the indication that 3D content is to be presented based on, for instance, a status of the battery 118 of the display device 102, 302, indicating that the display device 102, 302 is powered on, user input(s) received at the display device 102, 302, etc.

In the example of FIG. 10, the light source driver(s) 600 of the light field display controller 126 activate a first light source 108, 110, 200, 202, 204, 206, 304, 306, 400, 402, 404 during a first time period (block 1002). The light source driver(s) 600 activate the first light source 108, 110, 200, 202, 204, 206, 304, 306, 400, 402, 404 based on the light source activation rule(s) 602, which are stored in the database 604 of FIG. 6A. The light source activation rule(s) 602 define a sequence for activating particular ones of the light sources 108, 110, 200, 202, 204, 206, 304, 306, 400, 402, 404, a duration for which each light source 108, 110, 200, 202, 204, 206, 304, 306, 400, 402, 404 is to emit light, a duty cycle defining a duration of time for which red light, green light, blue light, or other colored light(s) are emitted during the activation of the respective light sources 108, 110, 200, 202, 204, 206, 304, 306, 400, 402, 404, etc.

In the example of FIG. 10, the spatial light modulator controller 606 of the light field display controller 126 activates (e.g., turns on) certain pixel(s) 210, 212, 214 of the spatial light modulator 114, 310 to cause the light emitted by the first light source 108, 110, 200, 202, 204, 206, 304, 306, 400, 402, 404 to be deflected toward projection optics 106, 314 of the display device 102, 302 (block 1004). The spatial light modulator controller 606 determines the pixel(s) 210, 212, 214 to be activated based on the spatial light modulator activation rule(s) 608 stored in the database 604 of FIG. 6. The spatial light modulator activation rule(s) 608 define the pixel(s) to be activated based on, for instance, the images of the 3D content to be presented. As a result of the deflection of the light from the first light source toward the projection optics 106, 314 by the activated pixels of the spatial light modulator 114, 310, the projection optics 106, 314 project a first image of 3D content corresponding to a first view of the 3D content (e.g., a first angular view).

In the example of FIG. 10, the light source driver(s) 600 of the light field display controller 126 activate a second light source 108, 110, 200, 202, 204, 206, 304, 306, 400, 402, 404 during a second time period (block 1006). The light source driver(s) 600 activate the second light source 108, 110, 200, 202, 204, 206, 304, 306, 400, 402, 404 based on the light source activation rule(s) 602, which define the sequence for activating particular ones of the light sources, the duty cycle for emission of red, green, and blue light by the second light source, etc.

In the example of FIG. 10, the spatial light modulator controller 606 of the light field display controller 126 activates certain pixel(s) 210, 212, 214 of the spatial light modulator 114, 310 to cause the light emitted by the second light source 108, 110, 200, 202, 204, 206, 304, 306, 400, 402, 404 to be deflected toward projection optics 106, 314 of the display device 102, 302 (block 1008). In some examples, the pixels of the spatial light modulator 114, 310 activated to deflect light from the second light source 108, 110, 200, 202, 204, 206, 304, 306, 400, 402, 404 are the same pixels activated to deflect light from the first light source. The activation of the pixels of the spatial light modulator 114, 310 is based on the spatial light modulator activation rule(s) 608. As a result of the deflection of the light from the second light source toward the projection optics 106, 314 by the activated pixels of the spatial light modulator 114, 310, the projection optics 106, 314 project a second image of 3D content corresponding to a second view of the 3D content (e.g., a second angular view). As described above, the exit pupil 216, 316 associated with the projection optics 106, 314 is divided by the number of light sources such that when a user places his or her eye at an exit pupil 216, 316, the user sees the different, time-multiplexed views of the 3D content.

In FIG. 10, the light source driver(s) 600 determine if another light source is to be activated based on a light source activation sequence defined by the light source activation rule(s) 602 (block 1010). If another light source 108, 110, 200, 202, 204, 206, 304, 306, 400, 402, 404 is to be activated in the sequence, the light source driver(s) 600 activate the light source during the particular time period associated with the light source activation sequence (block 1012). Also, the spatial light modulator controller 606 determines the pixels of the spatial light modulator 114, 310 to be activated to deflect light emitted by the light source(s) to provides the different views of the 3D content (block 1014).

The example instructions of FIG. 10 continue until there are no further light sources 108, 110, 200, 202, 204, 206, 304, 306, 400, 402, 404 to be activated in the sequence (block 1010). In the example of FIG. 10, the light source driver(s) 600 determine if the light source activation sequence should be repeated (block 1016). The light source driver(s) 600 determine whether the light source activation sequence should be repeated based on the light source activation rule(s) 602, which can define a duration of the time for the sequence to be implemented based on the images to be presented. The activation sequence of the light sources 108, 110, 200, 202, 204, 206, 304, 306, 400, 402, 404 can also be based on a refresh rate of the spatial light modulator 114, 310, which provides for time-multiplexed output of the images. The example instructions of FIG. 10 end when no further light sources are to be activated to emit light (block 1018).

FIG. 11 is a flowchart representative of example machine readable instructions which, when executed causes the light field display controller 126 of FIGS. 5 and/or 6B to control operation of a projection engine (e.g., the projection engine 505 including the first spatial light modulator 506 of FIG. 5) and spatial light modulator(s) (e.g., the second spatial light modulator 510 of FIG. 5) of a display device (e.g., the display device 502 of FIG. 5) to produce different angular or perspective views of 3D content. The example instructions of FIG. 11 can be executed by the light field display controller 126 of FIGS. 5 and/or 6B.

The example instructions of FIG. 11 begin with the light field display controller 126 receiving an indication that 3D content is to be presented via the display device 502 (block 1100). The light field display controller 126 can receive the indication that 3D content is to be presented based on, for instance, a status of a battery of the display device 502 indicating that the display device 502 is powered on, user input(s) received at the display device 502, etc.

In the example of FIG. 11, the light source driver(s) 600 of the light field display controller 126 instruct the projection engine 505 including the first spatial light modulator 506 to generate the projected image 508 to provide a first light source (block 1102). The light source driver(s) 600 instruct the projection engine 505 to generate the projected image 508 based on a light pattern or sequence defined by the light source activation rule(s) 602 stored in the database 604 of FIG. 6A. The projection engine 505 emits the projected image 508 in response to activation pixel(s) of the projection engine 505 based on the pattern. For example, the projection engine 505 generates the projected image 508 including a red square based on the pattern defining a sequence for activating pixel(s) of the projection engine to emit light. The red square corresponds to a red light source.

In the example of FIG. 11, the spatial light modulator controller 606 of the light field display controller 126 activates (e.g., turns on) certain pixel(s) of the second spatial light modulator 510 to cause the light associated with the first light source represented in the projected image 508 to be deflected toward projection optics 514 of the display device 502 (block 1104). The spatial light modulator controller 606 determines the pixel(s) of the second spatial light modulator 510 to be activated based on the spatial light modulator activation rule(s) 608 stored in the database 604 of FIG. 6. The spatial light modulator activation rule(s) 608 define the pixel(s) to be activated based on, for instance, the images of the 3D content to be presented. As a result of the deflection of the light from the first light source toward the projection optics 514 by the activated pixels of the second spatial light modulator 510, the projection optics 514 project a first image of 3D content corresponding to a first view of the 3D content (e.g., a first angular view).

In the example of FIG. 11, the light source driver(s) 600 of the light field display controller 126 instruct the projection image 508 to generate the projected image 508 to provide a second light source (block 1106). For example, the projection engine 505 generates the projected image 508 including a green square corresponding to a green light source based on the pattern defining the sequence for activating pixel(s) of the projection engine 505.

In the example of FIG. 11, the spatial light modulator controller 606 of the light field display controller 126 activates certain pixel(s) of the second spatial light modulator 510 to cause the light associated with the second light source represented in the projected image 508 to be deflected toward projection optics 514 of the display device 502 (block 1108). In some examples, the pixels of the second spatial light modulator 510 activated to deflect light from the second light source of the projected image 508 are the same pixels activated to deflect light from the first light source. The activation of the pixels of the second spatial light modulator 510 is based on the spatial light modulator activation rule(s) 608. As a result of the deflection of the light from the second light source toward the projection optics 514 by the activated pixels of the second spatial light modulator 510, the projection optics 514 project a second image of 3D content corresponding to a second view of the 3D content (e.g., a second angular view). As described above, the exit pupil 516 associated with the projection optics 514 is divided by the number of light sources such that when a user places his or her eye at an exit pupil 516, the user sees the different, time-multiplexed views of the 3D content.

In FIG. 11, the light source driver(s) 600 determines if another light source should be generated via the projected image 508 created by the projection engine 505 based on the light pattern defined by the light source activation rule(s) 602 (block 1110). If another light source is to be provided, the light source driver(s) 600 instruct the projection engine 505 to generate the projected image 508 based on activation of particular pixel(s) of the projection engine 505 and the light pattern to provide another light source for the system 500 (block 1112). Also, the spatial light modulator controller 606 determines the pixels of the second spatial light modulator 510 to be activated to cause the light associated with the selected light source(s) represented in the projected image 508 to be deflected toward projection optics 514 of the display device 502 (block 1114).

The example instructions of FIG. 11 continue until there are no further light sources to be provided via the projected image 508 (block 1010). In the example of FIG. 11, the light source driver(s) 600 determine if the light pattern for generating the projected image 508 should be repeated (block 1116). The light source driver(s) 600 determine whether the projected image light pattern should be repeated based on the light source activation rule(s) 602, which can define a sequence for activating pixel(s) of the projection engine 505 to create the projected image 508. The example instructions of FIG. 11 end when no further light sources are to be activated via the projected image 508 to emit light (block 1118).

Figure 12:
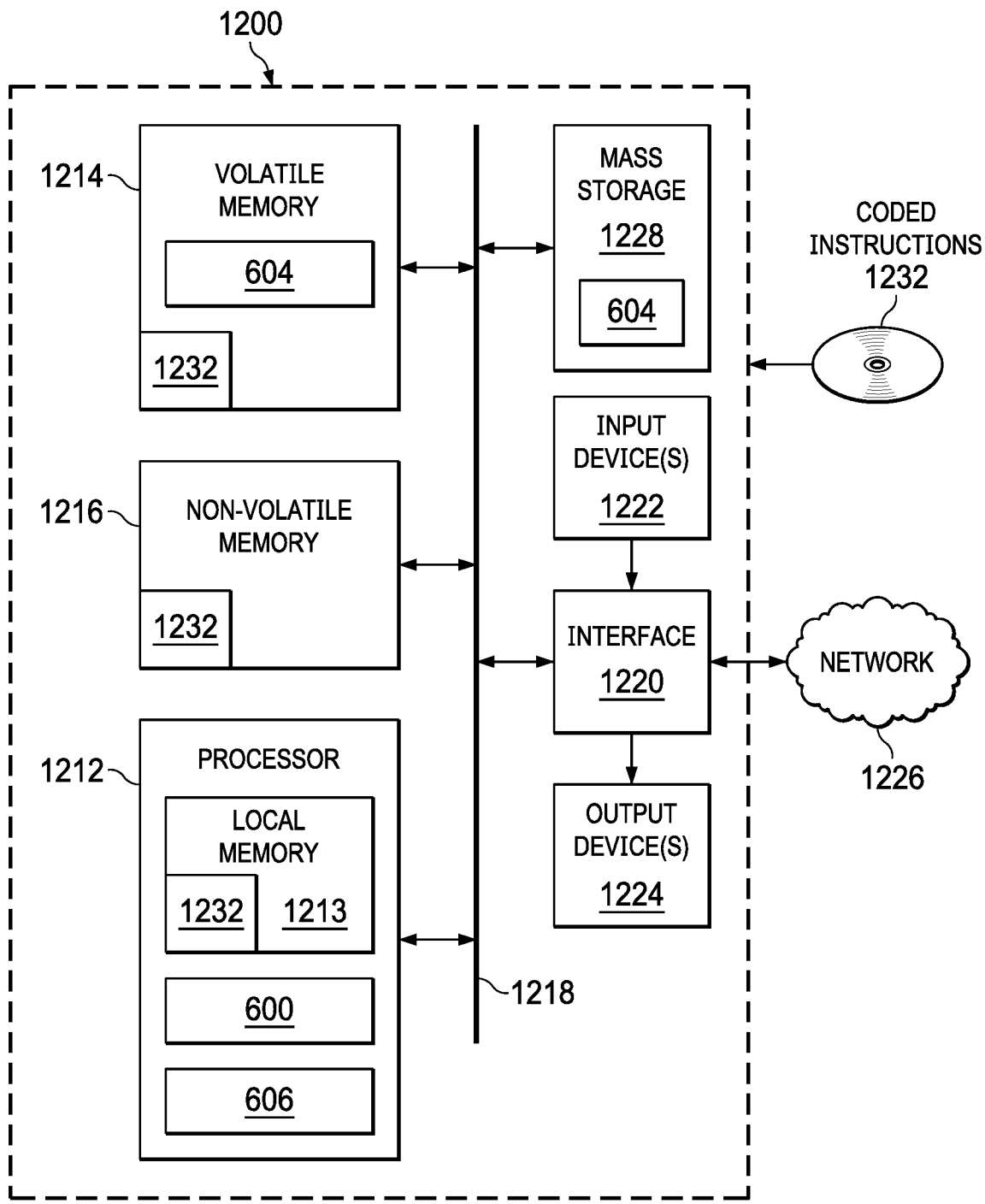
FIG. 12 is a block diagram of an example processing platform structured to execute the instructions of FIG. 10 to implement the example light field display controller of FIG. 6A and/or FIG. 6B.

FIG. 12 is a block diagram of an example processor platform 1200 structured to execute the instructions of FIG. 10 and/or FIG. 11 to implement the light field display controller 126 of FIG. 6A and/or FIG. 6B. The processor platform 1200 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a personal video recorder, a headset or other wearable device, or any other type of computing device.

The processor platform 1200 of the illustrated example includes a processor 126. The processor 126 of the illustrated example is hardware. For example, the processor 126 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the light source driver(s) 600 and the spatial light modulator controller 606.

The processor 126 of the illustrated example includes a local memory 1213 (e.g., a cache). The processor 126 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 126. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 of FIG. 10 and/or FIG. 11 may be stored in the mass storage device 1228, in the volatile memory 1214, in the non-volatile memory 1216, and/or on a removable non-transitory computer readable storage medium such as a CD or DVD.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

Example methods, apparatus and articles of manufacture described herein provide for improved display of multiple perspective views of 3D digital content via a display device such as a head-mounted display device or a surface-mounted display device. Examples described herein provide for time-sequential activation of light sources, which causes to the light source(s) to emit light at different angles relative to a spatial light modulator. The spatial light modulator deflects the light from each light source to provide images corresponding to different angular views of the 3D content as a result of the different angles at which the light is focused on the spatial light modulator. An exit pupil of a lens system associated with the display device is divided into sub-pupils based on the number of light sources. As a result, when a user of the display device looks through the exit pupil, the user sees time-multiplexed views of the 3D content without sacrificing spatial resolution and with improved angular resolution of the images.

Example methods, apparatus, systems, and articles of manufacture to render 3D digital content having multiple views are described herein. Further examples and combinations thereof include the following:

Example 1 includes a device including a screen (303, 503), a first light source (108, 200, 202, 204, 206, 304, 400, 402, 404) configured to emit a first light (208, 220, 222, 224, 406, 412, 410) at a first angle during a first time period and a second light source (108, 200, 202, 204, 206, 304, 400, 402, 404) configured to emit a second light (208, 220, 222, 224, 406, 412, 410) at a second angle during a second time period. The second angle is different than the first angle. The second time period is different than the first time period. The device includes a spatial light modulator (114, 310, 510) configured to provide a first view (700, 800, 900) of digital content (702) based on the first angle of the first light (208, 220, 222, 224, 406, 412, 410) emitted during the first time period and a second view (700, 800, 900) of the digital content (702) based on the second angle of the second light (208, 220, 222, 224, 406, 412, 410) emitted during the second time period. The first light source (108, 200, 202, 204, 206, 304, 400, 402, 404) and the second light source (108, 200, 202, 204, 206, 304, 400, 402, 404) are electrically coupled to the spatial light modulator (114, 310, 510). The device includes projection optics (106, 314, 514) configured to project the first view (700, 800, 900) and the second view (700, 800, 900) for presentation via the screen (303, 503). The projection optics (106, 314, 514) is optically coupled to the first light source (108, 200, 202, 204, 206, 304, 400, 402, 404), the second light source (108, 200, 202, 204, 206, 304, 400, 402, 404), and the spatial light modulator (114, 310, 510).

Example 2 includes the device of example 1, wherein the first view (700, 800, 900) is a first angular view (700, 800, 900) of the digital content (702) and the second view (700, 800, 900) is a second angular view (700, 800, 900) of the digital content.

Example 3 includes the device of example 1, wherein the first light source (108, 200, 202, 204, 206, 304, 400, 402, 404) and the second light source (108, 200, 202, 204, 206, 304, 400, 402, 404) define pixels of a light source array (110, 306).

Example 4 includes the device of example 3, wherein the light source array (110, 306) is a microLED panel or an OLED panel.

Example 5 includes the device of example 1, wherein the first light includes a red light, a green light, and a blue light. The first light source (108, 200, 202, 204, 206, 304, 400, 402, 404, 505) is configured to emit the red light for a first duration of the first time period, the green light for a second duration of the first time period, and the blue light for a third duration of the first time period.

Example 6 includes the device of example 1, further including a lens (112, 308, 512) configured to direct the first light (208, 220, 222, 224, 406, 412, 410) emitted by the first light source (108, 200, 202, 204, 206, 304, 400, 402, 404) to the spatial light modulator (114, 310, 510). The lens (112, 308, 512) is optically coupled to the first light source (108, 200, 202, 204, 206, 304, 400, 402, 404), the second light source (108, 200, 202, 204, 206, 304, 400, 402, 404), and the spatial light modulator (114, 310, 510).

Example 7 includes the device of example 1, further including a projection engine (505) configured to generate a projected image (508) corresponding to the first light source (108, 200, 202, 204, 206, 304, 400, 402, 404).

Example 8 includes a method including causing, by executing an instruction with a processor (126), a first light source (304, 400, 402, 404) of a direct view display device (302, 502) to emit a first light (406, 412, 410); causing, by executing an instruction with the processor, a second light source (304, 400, 402, 404) of the direct display device (302, 502) to emit a second light (406, 412, 410); and selectively activating, by executing an instruction with the processor, pixels of a spatial light modulator (310, 510) of the direct view display device (302, 502) to provide a first image of digital content (702) based on the first light and a second image of digital content based on the second light. The first light (406, 412, 410) is to illuminate the pixels of the spatial light modulator (310, 510) at a first angle and the second light (406, 412, 410) is to illuminate the pixels of the spatial light modulator (310, 510) at a second angle, the second angle different than the first angle.

Example 9 includes the method of example 8, further including causing the first light source (304, 400, 402, 404) to emit the first light (406, 412, 410) at a first time and the second light source (304, 400, 402, 404) to emit the second light (406, 412, 410) at a second time, the second time occurring after the first time.

Example 10 includes the method of example 11, further including wherein the first light (406, 412, 410) includes a red light, a green light, and a blue light, and further including causing the first light source (304, 400, 402, 404) to emit the red light, the green light, and the blue light based on a duty cycle.

Example 11 includes the method of example 11, wherein the first image is a first perspective view (700, 800, 900) of the digital content (702) and the second image is a second perspective view (700, 800, 900) of the digital content.

Example 12 includes the method of example 11, further including causing a third light source (304, 400, 402, 404) of the direct view display device to emit a third light (406, 412, 410) at a third time, the third light (406, 412, 410) to illuminate the pixels of the spatial light modulator (310, 510) at a third angle, the third angle different than the first angle and the second angle.

Example 13 includes the method of example 8, instructing a projection engine (505) to generate a projected image (508) corresponding to the first light source (304, 400, 402, 404).

Example 14 includes the method of example 13, further including instructing the projection engine (505) to generate the projected image (508) corresponding to the second light source (304, 400, 402, 404) based on a pattern for the projected image (508).

Example 15 includes a device including means for emitting light (108, 200, 202, 204, 206, 304, 400, 402, 404, 505) configured to emit a first light (208, 220, 222, 224, 406, 412, 410) and a second light (208, 220, 222, 224, 406, 412, 410). The device includes projection optics (106, 314, 514) configured to project a first image based on the first light and a second image based on the second light, and a spatial light modulator (114, 310, 510) configured to direct the first light (208, 220, 222, 224, 406, 412, 410) and the second light (208, 220, 222, 224, 406, 412, 410) relative to the projection optics (106, 314, 514). The first light (208, 220, 222, 224, 406, 412, 410) is to be focused on the spatial light modulator (106, 314, 514) at a first angle and the second light (208, 220, 222, 224, 406, 412, 410) is to be focused on the spatial light modulator (106, 314, 514) at a second angle. The first angle is different than the second angle. The projection optics (106, 314, 514) is optically coupled to the means for emitting light (108, 200, 202, 204, 206, 304, 400, 402, 404, 505) and the spatial light modulator (114, 310, 510).

Example 16 includes the device of example 15, wherein the means for emitting light (108, 200, 202, 204, 206, 304, 400, 402, 404, 505) includes a light array (110, 306) including a first light source (108, 200, 202, 204, 206, 304, 400, 402, 404) and a second light source (108, 200, 202, 204, 206, 304, 400, 402, 404).

Example 17 includes the device of example 15, wherein the means for emitting light (108, 200, 202, 204, 206, 304, 400, 402, 404, 505) includes a projection engine (505) configured to generate a projected image (508) based on activation of a first pixel of the projection engine (505). The projected image (508) corresponds to a first light source (108, 200, 202, 204, 206, 304, 400, 402, 404).

Example 18 includes the device of example 17, wherein the projection engine (505) is configured to generate the projected image (508) corresponding to a second light source (108, 200, 202, 204, 206, 304, 400, 402, 404) based on activation of a second pixel of the projection engine (505).

Example 19 includes the device of example 15, wherein the spatial light modulator (114, 310, 510) includes a digital micromirror device.

Example 20 includes the device of example 15, further including a Fresnel screen (303, 503).

Modifications are possible in the described embodiments, and other embodiments are possible, within the scope of the claims.

What is claimed is:

1. A device comprising:
    a first light source configured to emit first light during a first time period;
    a second light source configured to emit second light during a second time period, the second time period different than the first time period;
    a spatial light modulator optically coupled to the first light source and to the second light source, the spatial light modulator configured to:
        receive the first light at a first angle;
        provide a first view of digital content based on the first angle of the first light emitted during the first time period;
        receive the second light at a second angle, wherein the second angle is different than the first angle; and
        provide a second view of the digital content based on the second angle of the second light emitted during the second time period;
    and
    projection optics optically coupled to the spatial light modulator, the projection optics configured to project the first view of the digital content through a first sub-pupil of a pupil of a near-eye display and to project the second view of the digital content through a second sub-pupil of the pupil of the near-eye display.

2. The device of claim 1, wherein the first view is a first angular view of the digital content and the second view is a second angular view of the digital content.

3. The device of claim 1, wherein the first light source and the second light source define pixels of a light source array.

4. The device of claim 3, wherein the light source array is a micro light emitting diode (microLED) panel or an organic light emitting diode (OLED) panel.

5. The device of claim 1, wherein the first light source is configured to emit red light for a first duration of the first time period, to emit green light for a second duration of the first time period, and to emit blue light for a third duration of the first time period.

6. The device of claim 1, further including a lens configured to direct the first light emitted by the first light source to the spatial light modulator, the lens optically coupled to the first light source, the second light source, and the spatial light modulator.

7. The device of claim 1, further including a projection engine configured to generate a projected image corresponding to the first light source.

8. The device of claim 1, wherein the projection optics is a projection optics eyepiece.

9. The device of claim 1, further comprising a processor electrically coupled to the first light source, to the second light source, and to the spatial light modulator, wherein the processor is configured to:
    instruct the first light source to emit the first light during the first time period;
    instruct the second light source to emit the second light during the second time period; and
    instruct the spatial light modulator to selectively activate pixels.

10. A device comprising:
    a first light source configured to emit first light during a first time period;
    a second light source configured to emit second light during a second time period, the second time period different than the first time period;
    a spatial light modulator optically coupled to the first light source and to the second light source, the spatial light modulator configured to:
        receive the first light at a first angle;
        provide a first view of digital content based on the first angle of the first light emitted during the first time period;
        receive the second light at a second angle, wherein the second angle is different than the first angle; and
        provide a second view of the digital content based on the second angle of the second light emitted during the second time period;
    a screen; and
    projection optics optically coupled to the spatial light modulator and to the screen, the projection optics configured to:
        project the first view of the digital content, using the screen, at a first projected exit pupil of an eyebox; and
        project the second view of the digital content, using the screen, at a second projected exit pupil of the eyebox.

11. The device of claim 10, wherein the spatial light modulator is a digital micromirror device.

12. The device of claim 10, wherein the first light source is a first projected image and the second light source is a second projected image, the device further comprising a projector configured to generate the first projected image and the second projected image.

13. The device of claim 10, wherein the first light source is a first light emitting diode (LED) and the second light source is a second LED.

14. The device of claim 10, wherein the first light source is configured to emit red light for a first duration of the first time period, to emit green light for a second duration of the first time period, and to emit blue light for a third duration of the first time period.

15. A method comprising:
    producing, by a first light source, first light during a first time period;
    producing, by a second light source, second light during a second time period, the second time period different than the first time period;
    receiving, by a spatial light modulator, the first light at a first angle, the spatial light modulator having a resolution and an etendue;
    providing, by the spatial light modulator, a first view of digital content based on the first angle of the first light emitted during the first time period;

receiving, by the spatial light modulator, the second light at a second angle, wherein the second angle is different than the first angle;

providing, by the spatial light modulator, a second view of the digital content based on the second angle of the second light emitted during the second time period;

projecting, by projection optics, the first view of the digital content through a first sub-pupil of a pupil; and projecting, by the projection optics, the second view of the digital content through a second sub-pupil of the pupil.

16. The method of claim 15, wherein generating the first light comprises:

generating red light for a first duration of the first time period;

generating green light for a second duration of the first time period; and generating blue light for a third duration of the first time period.

17. The method of claim 15, further comprising:

directing, by a lens, the first light by the first light source to the spatial light modulator; and directing, by the lens, the second light to the spatial light modulator.

18. The method of claim 15, wherein the first view is a first angular view of the digital content and the second view is a second angular view of the digital content.

19. The method of claim 15, wherein the first view is a first perspective view of the digital content and the second view is a second perspective view of the digital content.

20. The device of claim 1, further comprising:

a third light source configured to emit third light during a third time period, the third time period different than the first time period and the second time period; and a fourth light source configured to emit fourth light during a fourth time period, the fourth time period different than the first time period, the second time period, and the third time period;

wherein the spatial light modulator is further configured to:

receive the third light at a third angle, wherein the third angle is different than the first angle and the second angle;

provide a third view of the digital content based on the third angle of the third light emitted during the third time period;

receive the fourth light at a fourth angle, wherein the fourth angle is different than the first angle, the second angle, and the third angle; and provide a fourth view of the digital content based on the fourth angle of the fourth light emitted during the fourth time period; and wherein the projection optics is further configured to project the third view of the digital content through a third sub-pupil of the pupil of the near-eye display, and to project the fourth view of the digital content through a fourth sub-pupil of the pupil of the near-eye display.

* * * * *